US012649353B2

(12) United States Patent
Shimizu et al.

(10) Patent No.: US 12,649,353 B2
(45) Date of Patent: Jun. 9, 2026

(54) VEHICLE HEAT MANAGEMENT SYSTEM

(71) Applicant: SANDEN CORPORATION, Gunma (JP)

(72) Inventors: Nobutaka Shimizu, Gunma (JP); Osamu Takazawa, Gunma (JP); Ryo Miyakoshi, Gunma (JP); Wataru Iwazaki, Gunma (JP); Masaaki Sato, Gunma (JP)

(73) Assignee: SANDEN CORPORATION, Gunma (JP)

( * ) Notice: Subject to any disclaimer, the term of this patent is extended or adjusted under 35 U.S.C. 154(b) by 313 days.

(21) Appl. No.: 18/560,717

(22) PCT Filed: May 23, 2022

(86) PCT No.: PCT/JP2022/021122
§ 371 (c)(1),
(2) Date: Jun. 21, 2024

(87) PCT Pub. No.: WO2022/250020
PCT Pub. Date: Dec. 1, 2022

(65) Prior Publication Data
US 2024/0399825 A1    Dec. 5, 2024

(30) Foreign Application Priority Data
May 24, 2021    (JP) ................................ 2021-087068

(51) Int. Cl.
*B60H 1/00*    (2006.01)
(52) U.S. Cl.
CPC ..... *B60H 1/00907* (2013.01); *B60H 1/00278* (2013.01); *B60H 2001/00307* (2013.01);
(Continued)
(58) Field of Classification Search
CPC ........... B60H 1/00907; B60H 1/00278; B60H 2001/00307; B60H 2001/00928;
(Continued)

(56) References Cited

U.S. PATENT DOCUMENTS

2011/0197611 A1    8/2011    Hall
2012/0222441 A1    9/2012    Sawada et al.
2021/0316597 A1    10/2021    Okamura

FOREIGN PATENT DOCUMENTS

DE    102017112826 A1 *    5/2018    ......... B60H 1/32284
GB        2575546 A *    1/2020    ......... B60H 1/00921
(Continued)

OTHER PUBLICATIONS

English language translation of DE102017112826 to Kim et al. Translated Nov. 2025. (Year: 2018).*
(Continued)

*Primary Examiner* — Cassey D Bauer
(74) *Attorney, Agent, or Firm* — Rankin, Hill & Clark LLP

(57)    ABSTRACT

A vehicle heat management system includes a refrigerant circuit including a refrigerant-heat medium heat exchanger, and a heat medium circuit. Two or more of at least three heat exchangers are selected, and one of them functions as a condenser, and the other functions as an evaporator. The refrigerant-heat medium heat exchanger includes a first and a second refrigerant-heat medium heat exchanger. The heat medium circuit includes a switch device configured to be able to switch between a circuit state in which the heat medium having passed through the second refrigerant-heat medium heat exchanger flows to the first refrigerant-heat medium heat exchanger and a circuit state in which a flow path of the heat medium having passed through the first refrigerant-heat medium heat exchanger and a flow path of the heat medium having passed through the second refrigerant-heat medium heat exchanger form individual circuits, respectively.

15 Claims, 23 Drawing Sheets

(52) U.S. Cl.
CPC .............. *B60H 2001/00928* (2013.01); *B60H 2001/00935* (2013.01); *B60H 2001/00942* (2013.01); *B60H 2001/00949* (2013.01)

(58) Field of Classification Search
CPC .......... B60H 2001/00935; B60H 2001/00942; B60H 2001/00949; B60H 1/00914
See application file for complete search history.

(56) References Cited

FOREIGN PATENT DOCUMENTS

| | | | |
|---|---|---|---|
| JP | H11-286211 | A | 10/1999 |
| JP | 2011-112312 | A | 6/2011 |
| JP | 2012-505796 | A | 3/2012 |
| JP | 2020-104604 | A | 7/2020 |
| JP | 2021-020486 | A | 2/2021 |

OTHER PUBLICATIONS

International Search Report issued in Patent Application No. PCT/JP2022/021122 dated Aug. 9, 2022.
Written Opinion issued in Patent Application No. PCT/JP2022/021122 dated Aug. 9, 2022.
Office Action issued in Japanese Patent Application No. 2021-087068 dated Jun. 10, 2025.
Written Opinion issued in International Application No. PCT/JP2022/021122 dated Aug. 9, 2022.

* cited by examiner

VEHICLE HEAT MANAGEMENT SYSTEM

TECHNICAL FIELD

The present invention relates to a vehicle heat management system by a heat pump.

BACKGROUND ART

The vehicle heat management system by a heat pump adjusts the temperature of a heat medium circuit (water circuit) by using the heat release in a condenser and the heat absorption in an evaporator in the heat pump. Related art of Patent Literature 1 below includes: a refrigerant circuit including a compressor, a condenser, an evaporator and expansion means; a heat releasing device circuit through which heat medium subjected to a heat exchange with refrigerant via the condenser flows; and an element circuit through which the heat medium subjected to a heat exchange with the refrigerant via the evaporator flows. The heat releasing device circuit includes a heat releasing device (radiator) cooled by outdoor air while a vehicle is moving, and the element circuit includes an air conditioning heat exchanger configured to perform a heat exchange with the air in a vehicle compartment.

According to the related art, the heat releasing device circuit and the element circuit through which the heat medium is circulated form individual heat medium circuits, respectively, to perform air conditioning by absorbing the heat of the vehicle compartment and releasing the heat to the outside of the vehicle compartment. The heat releasing device circuit and the element circuit are connected in series to form a single circuit, and therefore to adjust the temperature with use of the heat medium obtained by mixing hot water in the heat releasing device circuit with cold water in the element circuit.

CITATION LIST

Patent Literature

PTL1: Japanese translation of PCT application No. 2012-505796

SUMMARY OF INVENTION

Problem to be Solved by the Invention

In the vehicle heat management system, for example, when indoor air conditioning and warm-up of a battery are performed at the same time, an air blowing temperature of the heating operation of the indoor air conditioning is required to be about 60 degrees Celsius, and the temperature for warming up the battery is required to be equal to or lower than 35 degrees Celsius of the maximum allowable temperature for the battery. Therefore, heat mediums having temperature ranges different from each other are needed when the temperature adjustments are performed at the same time. To address this with the above-described related art, the different temperature ranges are obtained by releasing part of the heat of the heat medium having a predetermined temperature, and this causes a problem of increasing the heat loss.

The present invention has been achieved to solve the above-described problem. It is therefore an object of the invention to provide a vehicle heat management system capable of adjusting the temperature by using the heat mediums having different temperature ranges while preventing the heat loss, and realizing various operation modes of the vehicle heat management system by providing switch devices in the heat medium circuit through which the heat mediums having different temperature ranges flow.

Solution to Problem

To achieve the above-described object, the invention provides a vehicle heat management system including: a refrigerant circuit configured to compress, condense, expand and evaporate refrigerant and including a refrigerant-heat medium heat exchanger; and a heat medium circuit through which heat medium having been subjected to a heat exchange with the refrigerant in the refrigerant-heat medium heat exchanger circulates. Two or more of at least three heat exchangers of in the refrigerant circuit are selected, and one of the selected heat exchangers functions as a condenser, and the other functions as an evaporator. The refrigerant-heat medium heat exchanger includes a first refrigerant-heat medium heat exchanger which is one of the selected heat exchangers, and a second refrigerant-heat medium heat exchanger which is the other of the selected heat exchangers. The heat medium circuit includes a switch device configured to be able to switch between a circuit state in which the heat medium having been subjected to a heat exchange in the second refrigerant-heat medium heat exchanger flows to the first refrigerant-heat medium heat exchanger and a circuit state in which a flow path of the heat medium having been subjected to a heat exchange in the first refrigerant-heat medium heat exchanger and a flow path of the heat medium having been subjected to a heat exchange in the second refrigerant-heat medium heat exchanger form individual circuits, respectively.

Effect of the Invention

According to the vehicle heat management system of the present invention, the vehicle heat management system having the above-described features, it is possible to adjust the temperature by using the heat mediums having different temperature ranges, and also possible to realize various operation modes of the vehicle heat management system by optionally and selectively switching among the heat medium circuits through which the heat mediums having different temperature ranges flow.

BRIEF DESCRIPTION OF DRAWINGS

FIG. 3B illustrates a second circuit state);

DESCRIPTION OF EMBODIMENTS

Hereinafter, an embodiment of the invention will be described in detail with reference to the drawings. In the description below, the same reference number in different drawings denotes the same component with the same function, and duplicate description for each of the drawings is omitted accordingly. Here, in the specification, "refrigerant" is a medium circulating through a refrigerant circuit and changes in its state (compressed, condensed, expanded, and evaporated) in a heat pump, and "heat medium" is a medium (including water and so forth) subjected to a heat exchange to absorb and release heat without changing its state.

<Refrigerant Circuit>

Figure 1:
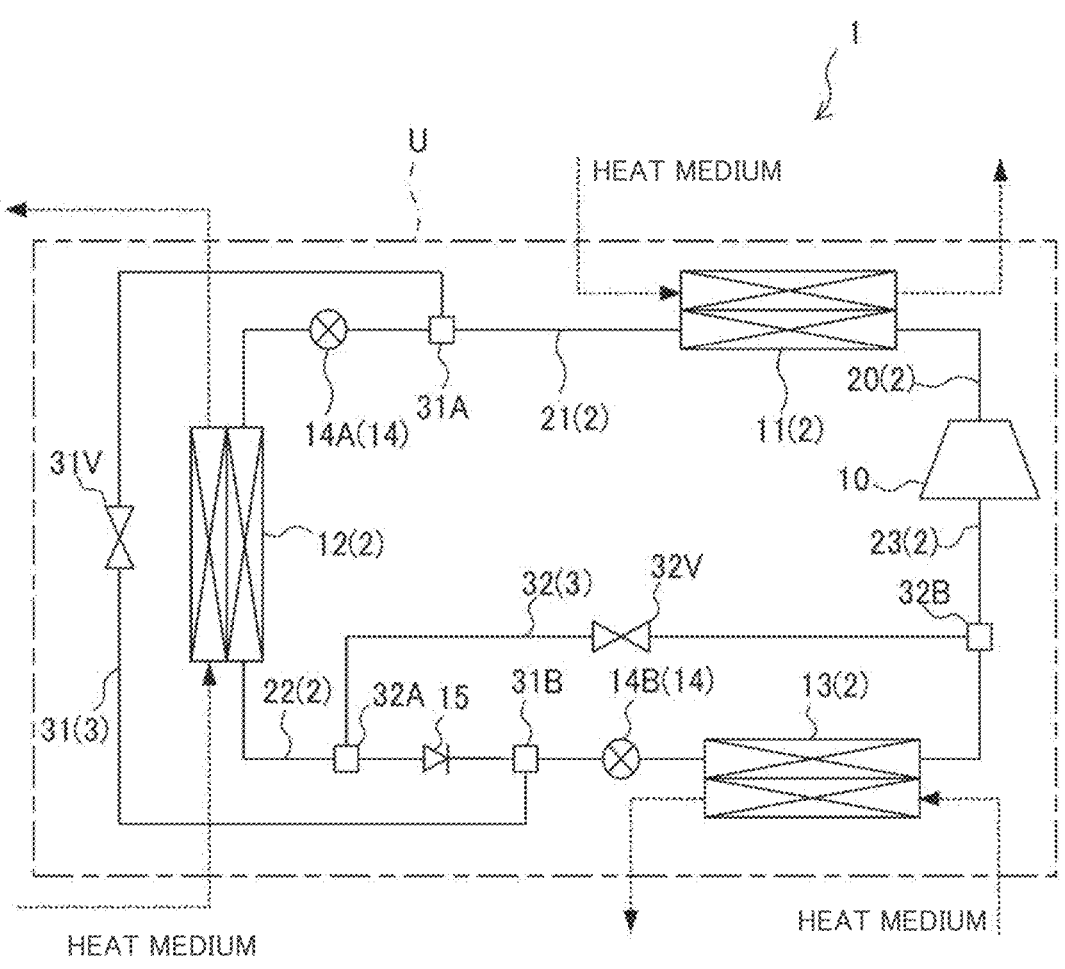
FIG. 1 illustrates a refrigerant circuit of a vehicle heat management system according to an embodiment of the invention.

As illustrated in FIG. 1, a vehicle heat management system according to an embodiment of the invention includes a refrigerant circuit 1 as a heat absorbing and releasing source. The refrigerant circuit 1 is a circuit configured to compress, condense, expand, and evaporate the refrigerant flowing therethrough, and includes a compressor 10 configured to compress the refrigerant, and a refrigerant circulating flow path 2 configured to condense, expand and evaporate the refrigerant having exiting from the compressor 10, and return the refrigerant to the compressor 10.

The refrigerant circulating flow path 2 of the refrigerant circuit 1 includes at least three heat exchangers. With the illustrated example, the three heat exchangers are a first refrigerant-heat medium heat exchanger 11 provided downstream of the compressor 10, a second refrigerant-heat medium heat exchanger 12 provided downstream of the first refrigerant-heat medium heat exchanger 11, and a third refrigerant-heat medium heat exchanger 13 provided upstream of the compressor 10. However, the refrigerant circuit 1 may include four or more heat exchangers as needed.

Two or more of at least three heat exchangers of the refrigerant circuit 1 are selected, and one of the selected heat exchangers functions as a condenser, and the other functions as an evaporator. In this case, the refrigerant does not flow through a heat exchanger which is not selected.

With the example illustrated in FIG. 1, on-off valves 31V and 32V is opened and closed to selectively open and close bypass refrigerant flow paths 3 (31, 32) to select the heat exchangers. By this means, it is possible to function the heat exchanger close to the compressor 10 as the condenser, and to function the heat exchanger far from the compressor 10 as the evaporator, in the downstream side of the compressor 10.

In FIG. 1, the refrigerant circulating flow path 2 of the refrigerant circuit 1 includes: a refrigerant flow path 20 connected to the outlet of the compressor 10 at one end and connected to the inlet of the first refrigerant-heat medium heat exchanger 11 at the other end; a refrigerant flow path 21 connected to the outlet of the first refrigerant-heat medium heat exchanger 11 at one end and connected to the inlet of the second refrigerant-heat medium heat exchanger 12 at the other end; a refrigerant flow path 22 connected to the outlet of the second refrigerant-heat medium heat exchanger 12 at one end and connected to the inlet of the third refrigerant-heat medium heat exchanger 13 at the other end; and a refrigerant flow path 23 connected to the outlet of the third refrigerant-heat medium heat exchanger at one end and connected to the inlet of the compressor 10 at the other end.

In addition, the refrigerant circuit 1 includes decompressors 14. The decompressors 14 are configured to decompress the refrigerant having a high pressure compressed by the compressor 10 to a predetermined pressure. With the example illustrated in FIG. 1, the decompressors 14 include a first decompressor 14A provided in the refrigerant flow path 21 between the first refrigerant-heat medium heat exchanger 11 and the second refrigerant-heat medium heat exchanger 12, and a second decompressor 14B provided in the refrigerant flow path 22 between the second refrigerant-heat medium heat exchanger 12 and the third refrigerant-heat medium heat exchanger 13. The first decompressor 14A and the second decompressor 14B can be adjusted individually to reduce the pressure to the predetermined pressure by optionally adjusting them from the fully open state to the fully closed state.

In the refrigerant circuit 1 illustrated in FIG. 1, the bypass refrigerant flow paths 3 provided in the refrigerant circulating flow path 2 are configured to be able to selectively bypass one of the second refrigerant-heat medium heat exchanger 12 and the third refrigerant-heat medium heat exchanger 13. With the illustrated example, the bypass refrigerant flow paths 3 include a bypass refrigerant flow path 31 configured to be able to bypass the second refrigerant-heat medium heat exchanger 12, and a bypass refrigerant flow path 32 configured to be able to bypass the third refrigerant-heat medium heat exchanger 13.

The bypass refrigerant flow path 31 includes a branching point 31A provided in the refrigerant flow path 21 and a joining point 31B provided in the refrigerant flow path 22. The branching point 31A is provided upstream of the first decompressor 14A, and the joining point 31B is provided upstream of the second decompressor 14B.

The bypass refrigerant flow path 32 includes a branching point 32A provided in the refrigerant flow path 22 and a joining point 32B provided in the refrigerant flow path 23. The branching point 32A is provided upstream of the joining point 31B of the bypass refrigerant flow path 31. By this means, the joining point 31B of the bypass refrigerant flow path 31 is provided between the branching point 32A of the bypass refrigerant flow path 32 and the third refrigerant-heat medium heat exchanger 13.

In addition, the branching point 32A of the bypass refrigerant flow path 32 is provided upstream of the second decompressor 14B and the joining point 31B of the bypass refrigerant flow path 31. A backflow preventer (for example, a check valve) 15 is provided between the branching point 32A of the bypass refrigerant flow path 32 and the joining point 31B of the bypass refrigerant flow path 31.

With this refrigerant circuit 1, by selecting the bypass refrigerant flow paths 3 and controlling the decompressors 14, it is possible to generate heat mediums having predetermined temperature ranges from selected ones of the first refrigerant-heat medium heat exchanger 11, the second refrigerant-heat medium heat exchanger 12, and the third refrigerant-heat medium heat exchanger 13, respectively. In addition, by combining with the switching of the heat medium circuits described later, it is possible to perform various heat management operation modes.

Moreover, the refrigerant circulating flow path 2 including the bypass refrigerant flow paths 3 of the refrigerant circuit 1 can be accommodated in a unit U indicated by the dashed line as illustrated. By this means, it is possible to unitize and compact the refrigerant circuit 1, and therefore to make it easy to conduct maintenance of the refrigerant flow paths 20 to 23 and the bypass refrigerant flow paths 3.

<Heat Medium Circuit>

The vehicle heat management system according to the present embodiment includes a heat medium circuit (for example, a water circuit) through which the heat medium having been subjected to a heat exchange with the refrigerant in the refrigerant-heat medium heat exchangers. With the illustrated example, the refrigerant-heat medium heat exchangers provided in the above-described refrigerant circuit 1 includes the first refrigerant-heat medium heat exchanger 11, the second refrigerant-heat medium heat exchanger 12, and the third refrigerant-heat medium heat exchanger 13.

Then, in the vehicle heat management system according to the present embodiment, the heat exchanges between the refrigerant and the heat mediums are performed in two or more heat exchangers selected from at least three heat exchangers provided in the refrigerant circuit 1. By this means, the heat mediums having various temperature ranges are generated and circulate in the heat medium circuit, and therefore it is possible to perform the heat management of various temperature-adjusted subjects.

Figure 2:
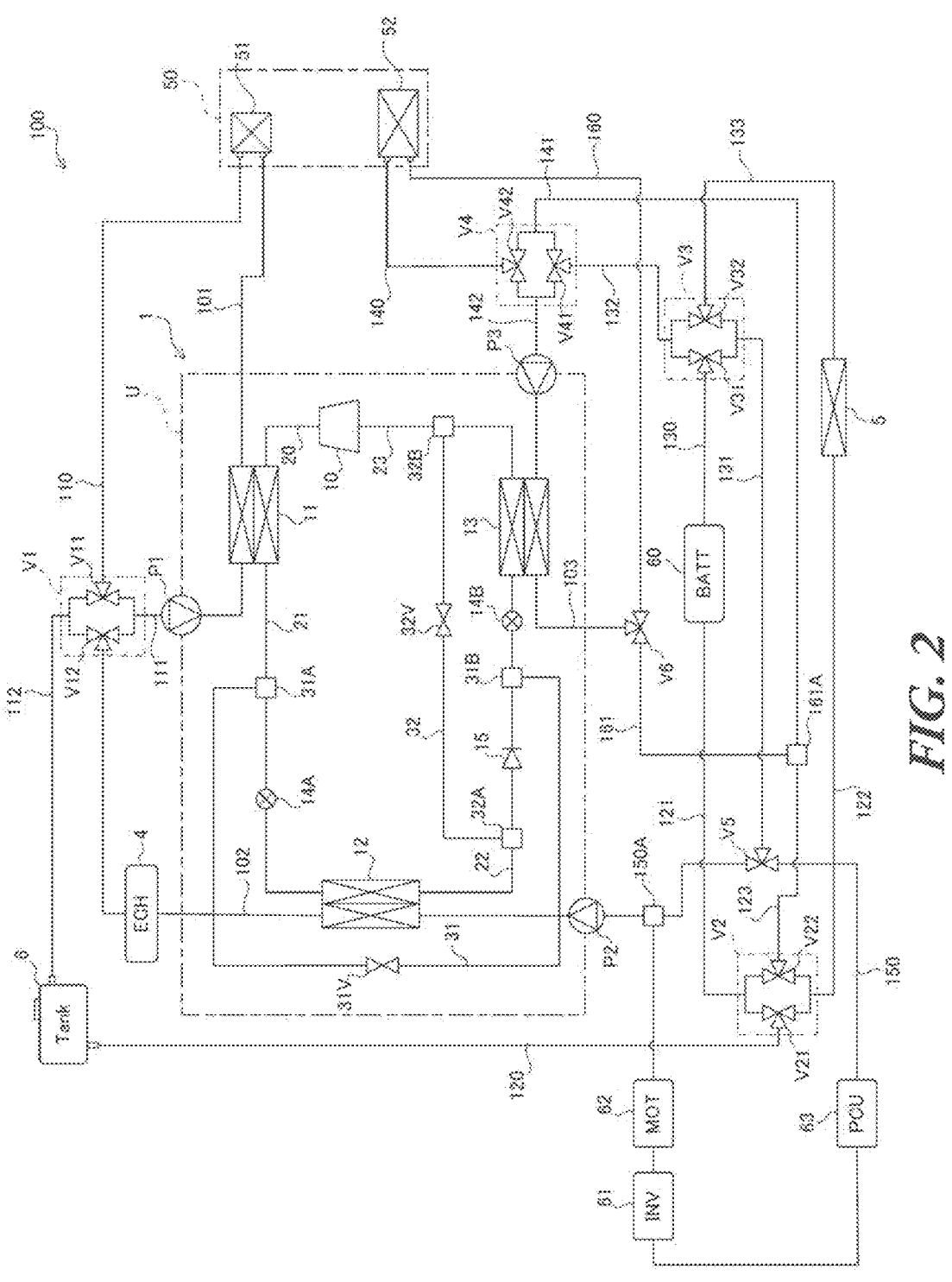
FIG. 2 illustrates an example of the configuration of the vehicle heat management system according to an embodiment of the invention.

With reference to FIG. 2, a concrete example of the configuration of the heat medium circuit will be described. A heat medium circuit 100 illustrated in FIG. 2 includes a heat medium flow path 101 running through the first refrigerant-heat medium heat exchanger 11, a heat medium flow path 102 running through the second refrigerant-heat medium heat exchanger 12, and a heat medium flow path 103 running through the third refrigerant-heat medium heat exchanger 13.

A circulating pump P1 configured to pump the heat medium into the first refrigerant-heat medium heat exchanger 11 is provided in the heat medium flow path 101; a circulating pump P2 configured to pump the heat medium into the second refrigerant-heat medium heat exchanger 12 is provided in the heat medium flow path 102; and a circulating pump P3 configured to pump the heat medium into the third refrigerant-heat medium heat exchanger 13 is provided in the heat medium flow path 103.

An auxiliary heater 4 may be provided in the heat medium flow path 101, 102, or 103, on the inlet side or the outlet side of the refrigerant-heat medium heat exchanger (the first refrigerant-heat medium heat exchanger 11, the second refrigerant-heat medium heat exchanger 12, or the third refrigerant-heat medium heat exchanger 13), as needed. FIG. 2 illustrates an example where the auxiliary heater 4 is provided in the heat medium flow path 102 on the outlet side of the second refrigerant-heat medium heat exchanger 12.

In addition, the heat medium flow paths 101, 102 and 103 of the heat medium circuit 100 are configured to allow the heat mediums to flow to the heat exchangers for different temperature-adjusted subjects, respectively.

With the example illustrated in FIG. 2, the heat medium flow path 101 is configured to allow the heat medium to flow to a heater core (a vehicle compartment air conditioning heat exchanger) 51 of an indoor air conditioner 50; the heat medium flow path 102 is configured to allow the heat medium to flow to temperature-adjusted subject heat exchangers 60 (61, 62, and 63) such as a battery; and the heat medium flow path 103 is configured to allow the heat medium to flow to a cooler core (a vehicle compartment air conditioning heat exchanger) 52 of the indoor air conditioner 50. The illustrated temperature-adjusted subject heat exchangers 60, 61, 62, and 63 are provided in, for example, the battery, an inverter, a motor, and a power control unit.

In addition, each of the heat medium flow paths 101, 102, and 103 of the heat medium circuit 100 is configured to be able to run through an outdoor heat exchanger (radiator) 5 to perform a heat exchange with the outdoor air, and therefore to be able to release the heat of the heat medium to the outside, or absorb the heat of the outdoor air into the heat medium, according to need.

The heat medium circuit 100 includes a tank 6 configured to store the heat medium to flow the heat medium at a predetermined flow rate, or to store the heat. With the illustrated example, the tank 6 is located downstream of the heat medium flow path 102, or downstream of the heater core 51. When switch devices described later are provided, it is preferred that the tank 6 is provided on the outlet side of the switch device which is the most frequently used in various operation modes.

<Switch Devices of Heat Medium Circuit>

The heat medium circuit 100 includes switch devices configured to switch among the above-described flow paths 101, 102, and 103 through which the heat mediums flow, in order to use the heat mediums matching intended purposes, or having desired temperature ranges. With the example illustrated in FIG. 2, the switch devices includes selector valves (three-way valves) V11, V12, V21, V22, V31, V32, V41, V42, V5, and V6, and each of which is configured to selectively open and close two outlets of the connected flow path to switch the flow path.

The selector valve V11 is configured to be able to switch to select whether the heat medium flow path 101 running through the first refrigerant-heat medium heat exchanger 11 forms an individual circuit or joins another flow path. With the example illustrated in FIG. 2, when the heat medium flow path 101 forms an individual circuit, the heat medium having been subjected to a heat exchange in the first refrigerant-heat medium heat exchanger 11 always flows to the heater core 51, flows through a flow path 110, enters the selector valve V11, exits from the selector valve 11, flows through a flow path 111, and returns to the first refrigerant-heat medium heat exchanger 11. On the other hand, when the heat medium flow path 101 joins another flow path, the heat medium having exited from the selector valve V11 flows through a flow path 112, and is stored in the tank 6 once.

The selector valve V12 is configured to be able to switch to select whether the heat medium flow path 102 running through the second refrigerant-heat medium heat exchanger 12 forms an individual circuit or the heat medium flow path 102 is connected to the heat medium flow path 101 to connect the first refrigerant-heat medium heat exchanger 11 to the second refrigerant-heat medium heat exchanger 12 in series. With the example illustrated in FIG. 2, when the heat medium flow path 102 forms an individual circuit, the heat medium having entered the selector valve V12 from the heat medium flow path 102 flows through the flow path 112 and is stored in the tank 6. On the other hand, when the heat medium flow path 102 is connected to the heat medium flow path 101, the heat medium having exited from the selector valve V12 flows through the flow path 111 and enters the first refrigerant-heat medium heat exchanger 11.

Figure 3A:
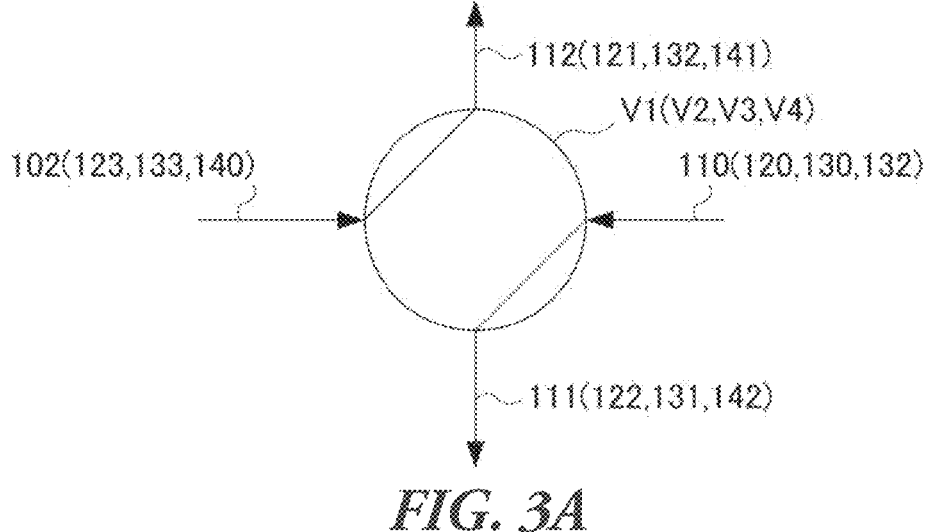
FIGS. 3A and 3B illustrate switching states of first, second, third and fourth switch devices (selector valves V1, V2, V3 and V4) (FIG. 3A illustrates a first circuit state.
Figure 3B:
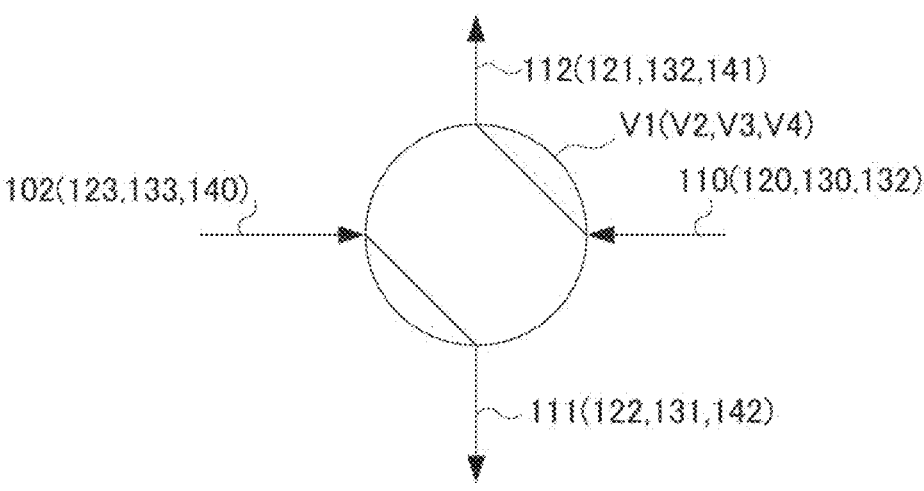

As illustrated in FIGS. 3A and 3B, the selector valve V11 and the selector valve V12 constitute an integral selector valve V1 (first switch device) and can be switched in conjunction with one another. The selector valve V1 can switch between a first circuit state where the flow path 110 is connected to the flow path 111 and the heat medium flow path 102 is connected to the flow path 112 as illustrated in FIG. 3A, and a second circuit state where the flow path 110 is connected to the flow path 112 and the heat medium flow path 102 is connected to the flow path 111 as illustrated in FIG. 3B.

The selector valve V1 is configured to be able to switch between the circuit state where the heat medium having passed through the second refrigerant-heat medium heat exchanger 12 flows to the first refrigerant-heat medium heat exchanger 11 (that is, the heat medium flow path 101 is connected to the heat medium flow path 102) and the circuit state where the heat medium flow path 101 through which the heat medium having passed through the first refrigerant-heat medium heat exchanger 11 flows and the heat medium flow path 102 through which the heat medium having passed through the second refrigerant-heat medium heat exchanger 12 flows form individual circuits, respectively.

By providing the selector valve V1, it is possible to switch between the operation mode in which the heat medium flow paths 101 and 102 are connected to one another to distribute the released heat among various destinations and the operation mode in which the heat medium flow paths 101 and 102 form individual circuits to deliver the heat mediums having different temperature ranges to different locations, respectively.

The selector valve 21 is configured to be able to switch to select whether the heat medium having exited from the tank 6 and flowing through the flow path 120 flows to the temperature-adjusted subject heat exchanger 60 via the flow path 121 or to the outdoor heat exchanger 5 via the flow path 122. In addition, the selector valve 22 is configured to be able to switch to select whether the heat medium flowing into the selector valve V22 from the flow path 123 flows to the temperature-adjusted subject heat exchanger 60 or to the outdoor heat exchanger 5 via the flow path 122.

As illustrated in FIGS. 3A and 3B, the selector valve V21 and the selector valve V22 constitute an integral selector valve V2 (second switch device) and can be switched in conjunction with one another. The selector valve V2 can switch between the first circuit state where the flow path 123 is connected to the flow path 121 and the flow path 120 is connected to the flow path 122 as illustrated in FIG. 3A, and the second circuit state where the flow path 123 is connected to the flow path 122 and the flow path 120 is connected to the flow path 121 as illustrated in FIG. 3B.

The selector valve V2 switches to select whether the heat medium having exited from the selector valve V1 (first switch device) flows to the temperature-adjusted subject heat exchanger 60 or to the outdoor heat exchanger 5. In addition, the selector valve V2 switches to select whether the heat medium having exited from a selector valve V4 described later flows to the temperature-adjusted subject heat exchanger 60 or to the outdoor heat exchanger 5.

By providing the selector valve V2, it is possible to switch to select whether the heat medium having exited from the selector valve V1 flows directly to the temperature-adjusted subject heat exchanger 60 to adjust the temperature of the temperature-adjusted subject or to the outdoor heat exchanger 5 to release the heat.

The selector valve V31 is configured to be able to switch to select whether the heat medium having exited from the temperature-adjusted subject heat exchanger 60 and flowing through the flow path 130 flows to the flow path 131 or to the flow path 132. In addition, the selector valve V32 is configured to be able to switch to select whether the heat medium having exited from the outdoor heat exchanger 5 and flowing into the selector valve V32 from the flow path 133 flows to the flow path 131 or to the flow path 132.

As illustrated in FIGS. 3A and 3B, the selector valve V31 and the selector valve V32 constitute an integral selector valve V3 (third switch device) and can be switched in conjunction with one another. The selector valve V3 is configured to be able to switch between the first circuit state where the flow path 130 is connected to the flow path 131 and the flow path 133 is connected to the flow path 132 as illustrated in FIG. 3A, and the second circuit state where the flow path 130 is connected to the flow path 132 and the flow path 133 is connected to the flow path 131 as illustrated in FIG. 3B.

Here, the selector valve V3 is switched in conjunction with the selector valve V2 (second switch device). That is, when the selector valve V2 is in the first circuit state (see FIG. 3(a)), the selector valve V3 is in the above-described second circuit state (see FIG. 3(b)). On the other hand, when the selector valve V2 is in the second circuit state (see FIG. 3(b)), the selector valve V3 is in the above-described first circuit state (see FIG. 3(a)).

Then, the selector valve V3 switches to select whether the heat medium having flowed to the temperature-adjusted subject heat exchanger 60 by the selector valve V2 flows to the second refrigerant-heat medium heat exchanger 12 via the flow path 131 and a selector valve V5 (fifth switch device) or to the third refrigerant-heat medium heat exchanger 13 via the flow path 132 and the selector valve V4 described later. Meanwhile, the selector valve V3 switches to select whether the heat medium having flowed to the outdoor heat exchanger 5 by the selector valve V2 flows to the third refrigerant-heat medium heat exchanger 13 via the flow path 132 and the selector valve V4 or to the second refrigerant-heat medium heat exchanger 12 via the flow path 131 and the selector valve V5 (fifth switch device).

The selector valve V41 is configured to be able to switch to select whether the heat medium flowing through the flow path 132 flows to the flow path 141 or the flow path 142. The selector valve V42 is configured to be able to switch to select whether the heat medium having exited from the cooler core 52 and flowing into the selector valve V42 from the flow path 140 flows to the flow path 141 or the flow path 142.

As illustrated in FIGS. 3A and 3B, the selector valve V41 and the selector valve V42 constitute the integral selector valve V4 (fourth switch device) and can be switched in conjunction with one another. The selector valve V4 can switch between the first circuit state where the flow path 140 is connected to the flow path 141 and the flow path 132 is connected to the flow path 142 as illustrated in FIG. 3A, and the second circuit state where the flow path 140 is connected to the flow path 142 and the flow path 132 is connected to the flow path 141 as illustrated in FIG. 3B.

Here, the selector valve V4 switches to select whether the heat medium having exited from the cooler core 52 (vehicle compartment air conditioning heat exchanger) flows to the third refrigerant-heat medium heat exchanger 13 or enters the selector valve V2 (second switch device). Then, as described above, the selector valve V2 (second switch device) also functions as a switch device configured to switch to select whether the heat medium having exited from the selector valve V4 (fourth switch device) flows to the temperature-adjusted subject heat exchanger 60 or the outdoor heat exchanger 5.

The selector valve V3 (third switch device) also functions as a switch device configured to switch to select whether the heat medium having exited from the outdoor heat exchanger 5 flows to the second refrigerant-heat medium heat exchanger 12 or the selector valve V4 (fourth switch device). The selector valve V4 (fourth switch device) also functions as a switch device configured to switch to select whether the heat medium having exited from the selector valve V3 (third switch device) flows to the third refrigerant-heat medium heat exchanger 13 or the selector valve V2 (second switch device).

The selector valve V5 (fifth switch device) is configured to switch to select whether or not to flow the heat medium having exited from the temperature-adjusted subject heat exchanger 60 or the outdoor heat exchanger 5 and passed through the selector valve V3 and the flow path 131 to the other temperature-adjusted subject heat exchangers 61, 62, and 63. When the selector valve V5 is switched to flow the heat medium to the other temperature-adjusted subject heat exchanger 61, 62, and 63, the heat medium flowing through the flow path 131 flows to the flow path 150, passes through the temperature-adjusted subject heat exchangers 61, 62 and 63, and joins the heat medium flow path 102 at a joining point 150A. When the selector valve V5 is switched not to flow the heat medium to the other temperature-adjusted subject heat exchanger 61, 62, and 63, the heat medium passing through the flow path 131 does not pass through the flow path 150 but flows directly to the heat medium flow path 102.

Here, the selector valves V2, V3, V4 and V5 allow the heat medium (the heat medium having exited from the tank 6) flowing through the flow path 120 to flow to the selector valve V3 via the selector valve V2, to flow to the selector valve V5 via the selector valve V3, and to flow to the second refrigerant-heat medium heat exchanger 12 via the selector valve V5, and allow the heat medium flowing through the flow path 123 to flow to the selector valve V3 via the selector valve V2, to flow to the selector valve V4 via the selector valve V3, and to flow to the selector valve V2 via the selector valve V4.

A selector valve V6 (sixth switch device) is configured to switch to select whether the heat medium subjected to a heat exchange in the third refrigerant-heat medium heat exchanger 13 flows from the heat medium flow path 103 to the cooler core (vehicle compartment air conditioning heat exchanger) 52 or flows to the selector valve V2 (second switch device) via the flow path 123. One switching state of the selector valve V6 allows the heat medium flowing through the heat medium flow path 103 to flow through the flow path 160 toward the cooler core 52 and the other switching state allows the heat medium flowing through the heat medium flow path 103 to flow through the flow path 161 and join the flow path 103 at a joining point 161A.

<Operation Mode (Controller)>

Figure 4:
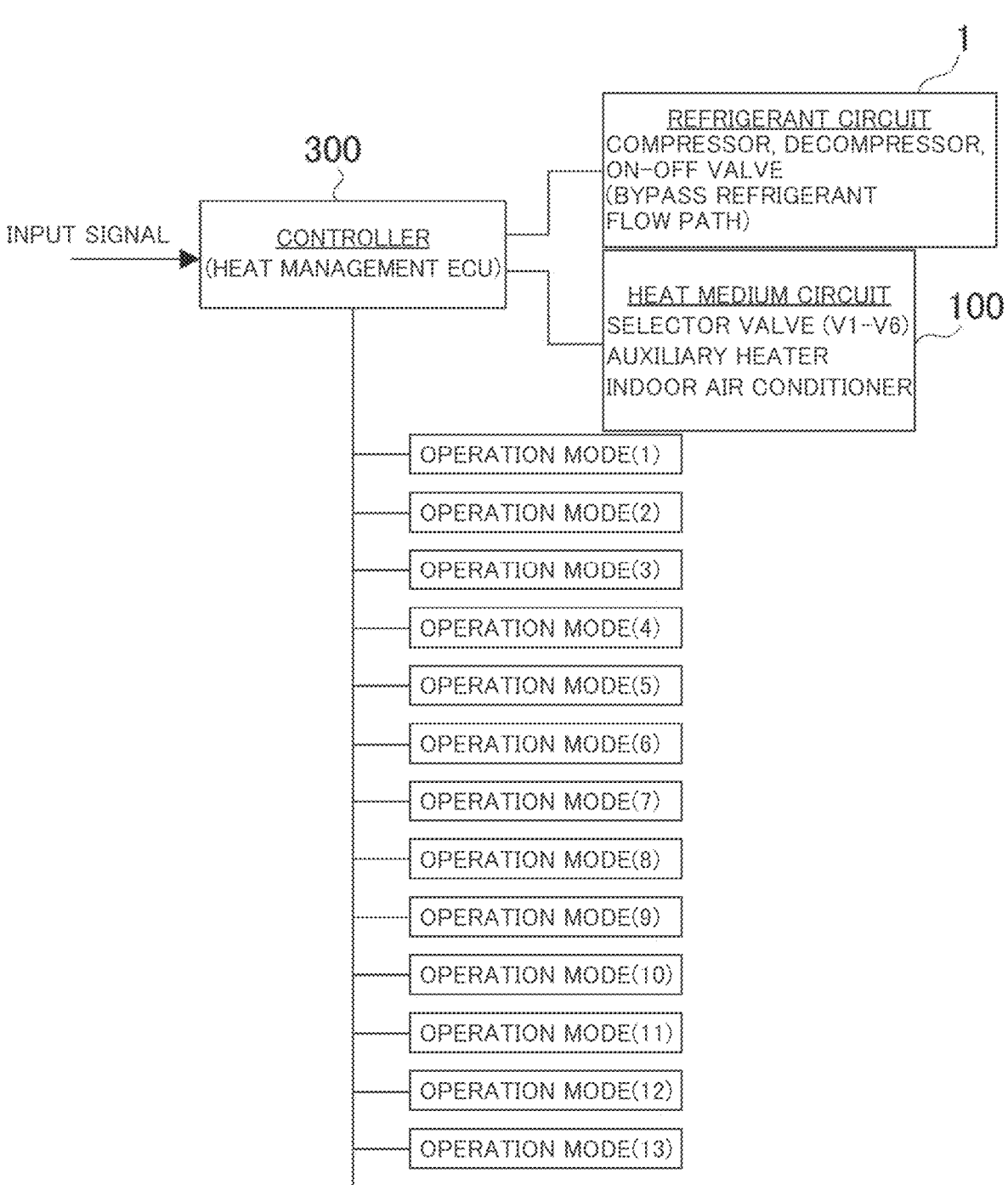
FIG. 4 illustrates an example of the system configuration of the vehicle heat management system.

As illustrated in FIG. 4, the vehicle heat management system according to an embodiment of the invention includes a controller (heat management ECU) 300 configured to control the refrigerant circuit 1 and the heat medium circuit 100 to perform various operation modes. The controller 300 receives air conditioning operation signals and signals from other ECUs of the vehicle, and controls compressor 10, the decompressors 14 (14A and 14B), and the on-off valves 31V and 32V of the bypass refrigerant flow paths 3 (31, 32) in the refrigerant circuit 1, and also controls the switch devices (selector valves V1 to V6), the auxiliary heater 6, and the indoor air conditioner 50 in the heat medium circuit 100 to perform various operation modes as described below.

In the drawings below, flow paths not in use in the refrigerant circuit 1 and the heat medium circuit 100 are indicated by broken lines, the opening directions of the selector valves and the on-off valves are indicated in white, and the closing directions are indicated in black.

Figure 5:
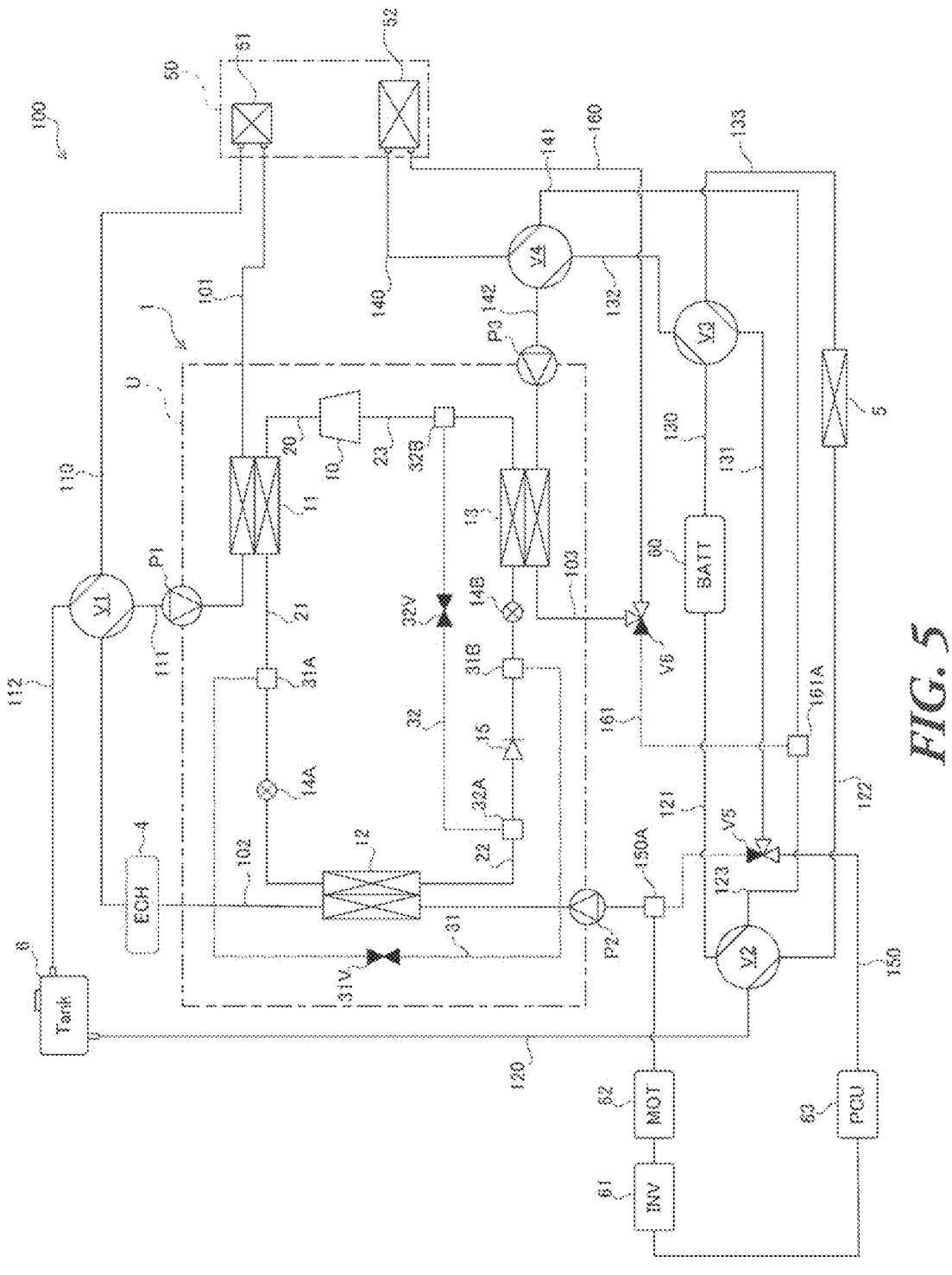
FIG. 5 illustrates operation mode (1)

Operation mode (1) illustrated in FIG. 5 is an operation mode to cool the battery while the indoor air conditioner 50 performs the cooling operation. In this operation mode (1), the on-off valves 31V and 32V are closed to close the bypass refrigerant flow paths 31 and 32 in the refrigerant circuit 1. In addition, in the refrigerant circuit 1, the amount of decompression of the decompressors 14A and 14B is appropriately adjusted, the decompressor 14A is approximately fully opened, and the decompressor 14B reduces the pressure as desired. In the refrigerant circuit 1, the first refrigerant-heat medium heat exchanger 11 and the second refrigerant-heat medium heat exchanger 12 function as condensers (the heat release side), and the third refrigerant-heat medium heat exchanger 13 functions as an evaporator (the heat absorption side).

In the heat medium circuit 100, the heat medium passing through the heat medium flow path 103 running through the third refrigerant-heat medium heat exchanger 13 becomes cold water because of heat absorption in the third refrigerant-heat medium heat exchanger 13, and enters the cooler core 52 of the indoor air conditioner 50 via the selector valve V6 to cool the vehicle compartment. The heat medium having exited from the cooler core 52 passes through the selector valve V4, enters the selector valve V2, flows through the flow path 121, and flows into the temperature-adjusted subject heat exchanger 60 to cool the battery. The heat medium having exited from the temperature-adjusted subject heat exchanger 60 passes through the selector valve V3 and the selector valve V4, and returns to the heat medium flow path 103.

In this case, the heat medium (cold water) flowing through the heat medium flow path 103 on the heat absorption side flows through an individual circulating flow path, and is subjected to heat exchanges in the cooler core 52 and the temperature-adjusted subject heat exchanger 60, and then the heat is efficiently absorbed in the third refrigerant-heat medium heat exchanger 13.

Moreover, in the operation mode (1), the heat medium flowing through the heat medium flow path 101 on the heat release side passes through the heater core 51 of the indoor air conditioner 50, the selector valve V1, the tank 6, the selector valve V2, the outdoor heat exchanger 5, the selector valve V3, the selector valve V5, the temperature-adjusted subject heat exchangers 63, 61, and 62, flows into the heat medium flow path 102 running through the second refrigerant-heat medium heat exchanger 12, and returns to the heat medium flow path 101 via the selector valve V1.

In this way, in the operation mode (1), the first refrigerant-heat medium heat exchanger 11 and the second refrigerant-heat medium heat exchanger 12 are on the heat release side, and the heat medium flow paths 101 and 102 on the heat release side are connected to one another. Therefore, the released heat is distributed among the tank 6 to store the heat, the outdoor heat exchanger 5 to release the heat to the outside, and the temperature-adjusted subject heat exchangers 63, 61, and 62 to adjust the temperatures. By this means, the heat absorbed by intensively performing the cooling operation and cooling the battery is distributed and released in various locations. Consequently, it is possible to efficiently use the heat.

Figure 6:
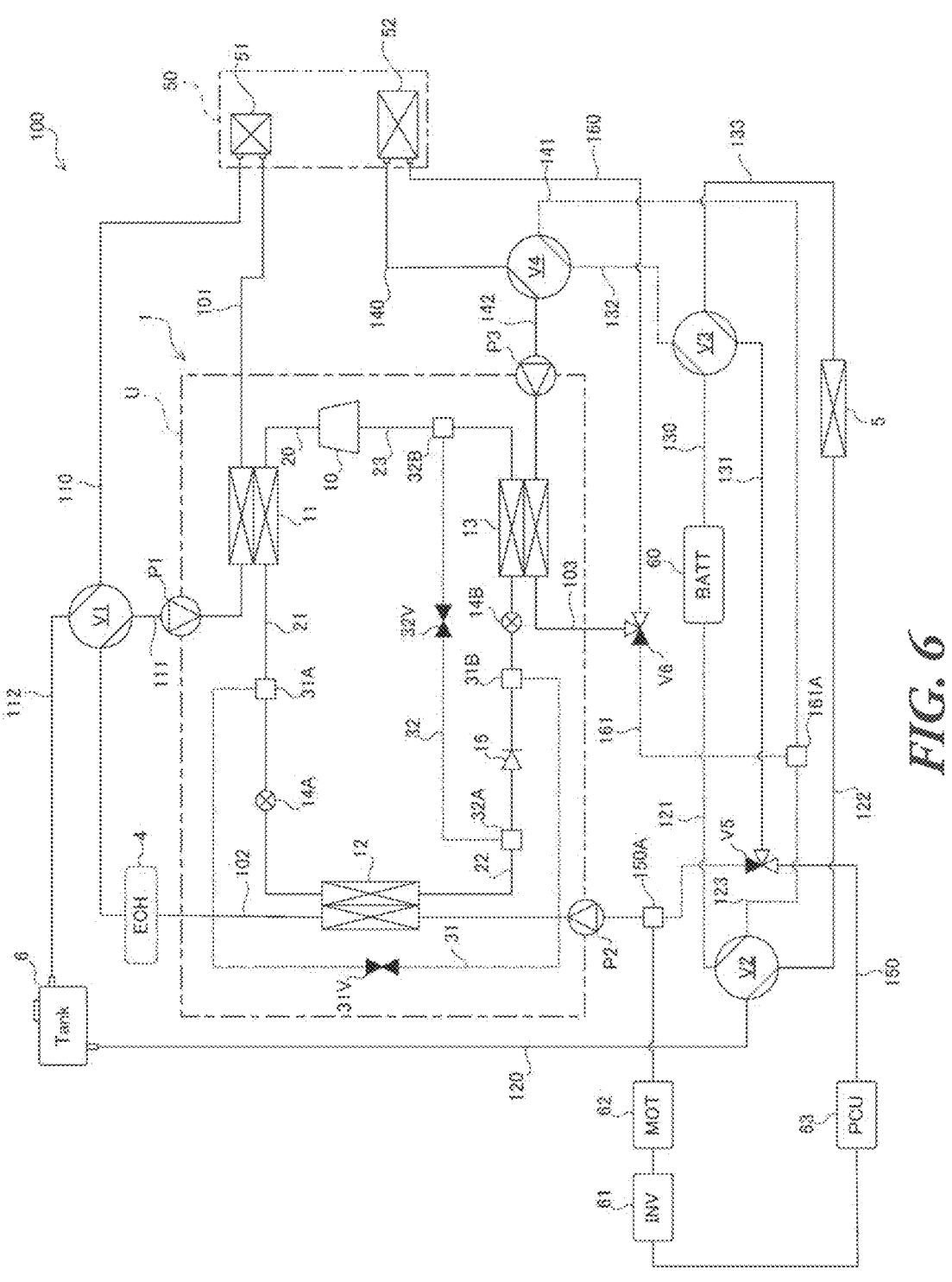
FIG. 6 illustrates operation mode (2)

Operation mode (2) illustrated in FIG. 6 is an operation mode in which the cooling of the battery in the operation mode (1) is stopped, and the cooling operation is performed by the indoor air conditioner 50. In the operation mode (2), the refrigerant circuit 1 is the same as in the operation mode (1), and in the heat medium circuit 100, the heat medium flowing through the heat medium flow path 103 passes through the selector valve V6, enters the cooler core 52, exits from the cooler core 52, passes through the selector valve V4, and returns directly to the heat medium flow path 103. The heat medium flowing through the heat medium flow paths 101 and 102 in the heat medium circuit 100 is the same as in the operation mode (1).

Figure 7:
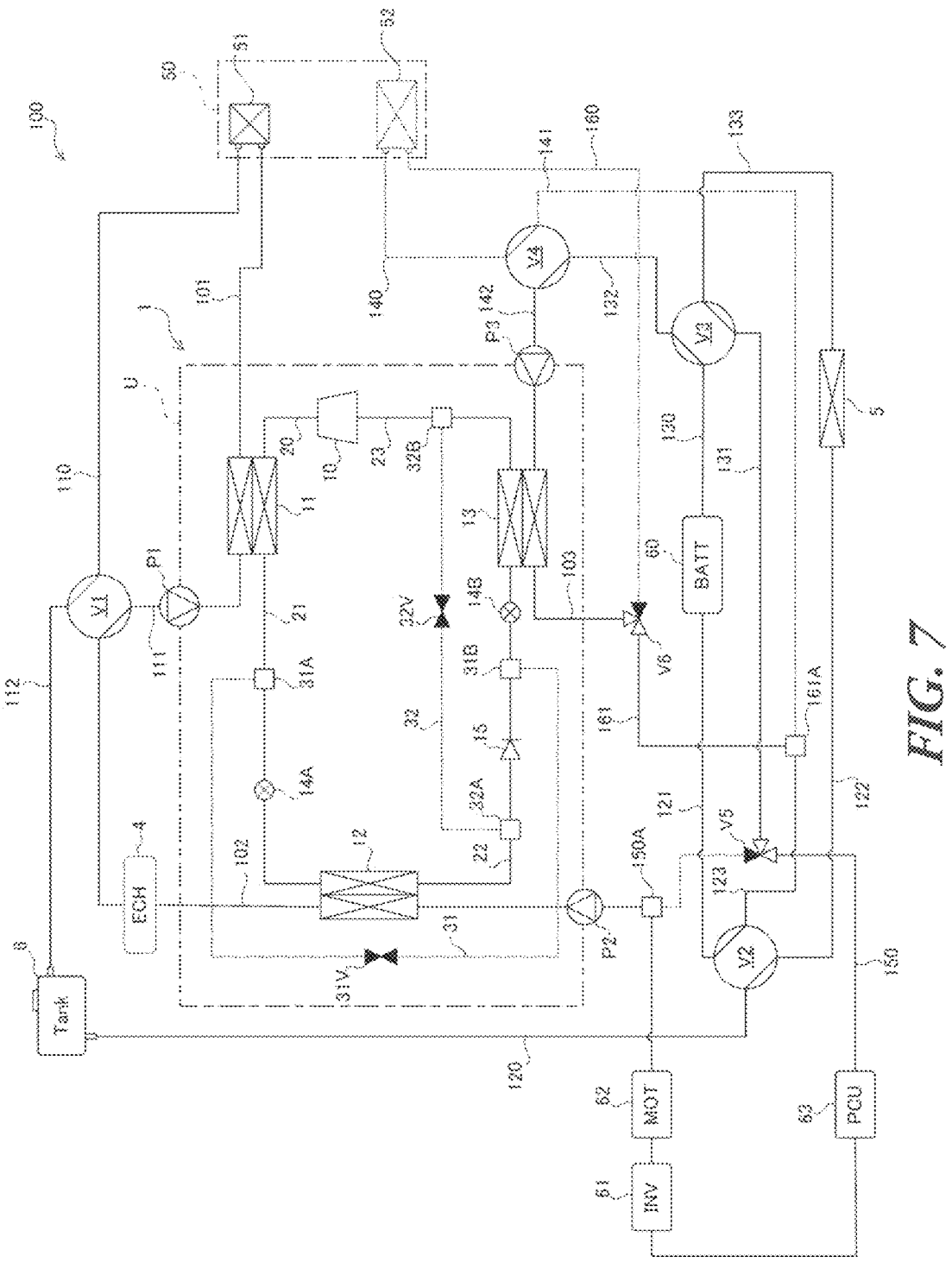
FIG. 7 illustrates operation mode (3)

Operation mode (3) illustrated in FIG. 7 is an operation mode in which the cooling operation performed by the indoor air conditioner 50 in the operation mode (1) is stopped, and the battery is intensively cooled. In the operation mode (3), the refrigerant circuit 1 is the same as in the operation mode (1), and in the heat medium circuit 100, the heat medium flowing through the heat medium flow path 103 on the heat absorption side passes through the selector valve V6 and the selector valve V2, flows into the temperature-adjusted subject heat exchanger 60 for the battery, exits from the temperature-adjusted subject heat exchanger 60, passes through the selector valve V3 and the selector valve V4, and returns to the heat medium flow path 103. In this case, the selector valve V6 is switched to prevent the heat medium from flowing to the flow path 160, and therefore to prevent the heat medium from flowing to the cooler core 52. The heat medium flowing through the heat medium flow paths 101 and 102 in the heat medium circuit 100 on the heat release side is the same as in the operation mode (1).

Figure 8:
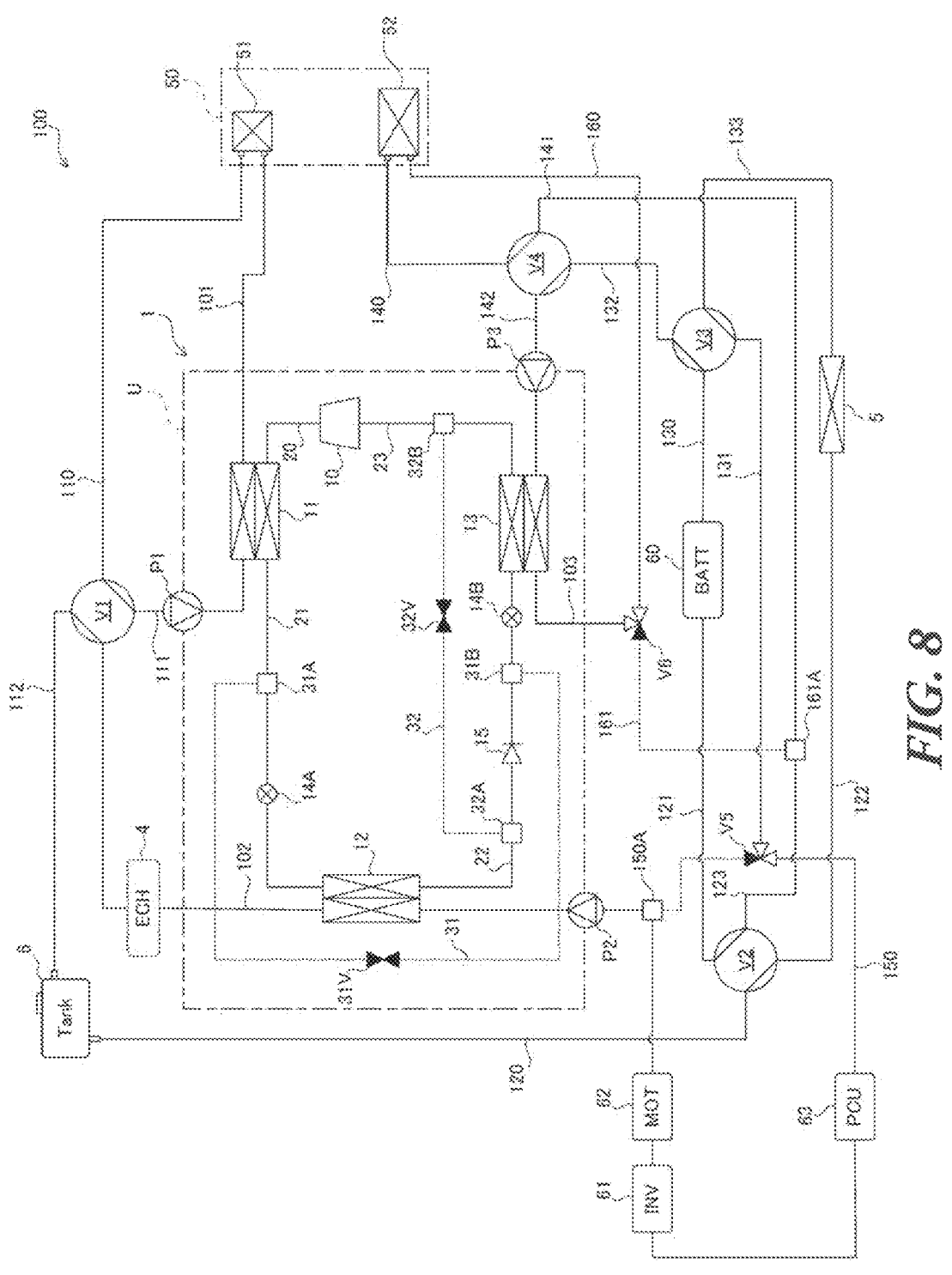
FIG. 8 illustrates operation mode (4)

Operation mode (4) illustrated in FIG. 8 is an operation mode to perform a cooling and dehumidifying operation (the temperature adjustment by heat release), and in the same way as in the operation mode (1), the battery is cooled while the cooling operation is performed by the indoor air conditioner 50, and the heat medium flowing through the heat medium flow path 101 on the heat release side is solely flowed into the heater core 51 of the indoor air conditioner 50 to perform a dehumidifying operation.

In the operation mode (4), while the bypass refrigerant flow paths 31 and 32 of the refrigerant circuit 1 are closed in the same way as in the operation mode (1), the decompressors 14A and 14B reduce the pressure in stages. The heat medium flow paths 101, 102, and 103 of the heat medium circuit 100 form individual circuits, respectively.

In the operation mode (4), the heat medium flowing through the heat medium flow path 101 on the heat release side becomes hot water by the heat release in the first refrigerant-heat medium heat exchanger 11, and enters the heater core 51, and therefore is solely used to perform the air conditioning and the temperature adjustment. In addition, the heat medium flowing through the heat medium flow path 102 on the heat release side becomes hot water having a temperature range lower than that of the heat medium flowing through the heat medium flow path 101, by the heat release in the second refrigerant-heat medium heat exchanger 12, passes through the selector valve V1, the tank 6, the selector valve V2, the outdoor heat exchanger 5, the selector valve V3, the selector valve V5, and the temperature-adjusted subject heat exchangers 63, 61, and 62, and returns to the heat medium flow path 102. Meanwhile, the heat medium flowing through the heat medium flow path 103 on the heat absorption side flows through the circulating flow path in which the heat medium passes through the cooler core 52 and the temperature-adjusted subject heat exchanger 60 for the battery, in the same way as in the operation mode (1).

In the operation mode (4), while the cooling and dehumidifying operation is performed, and the battery is cooled on the heat absorption side, it is possible to adjust the temperature to a target blowing temperature by the heat medium having a high temperature flowing through the individual heat medium flow path 101, and to adjust the temperatures at various locations by the heat medium having a low temperature flowing through the individual heat medium flow path 102 on the heat release side.

Figure 9:
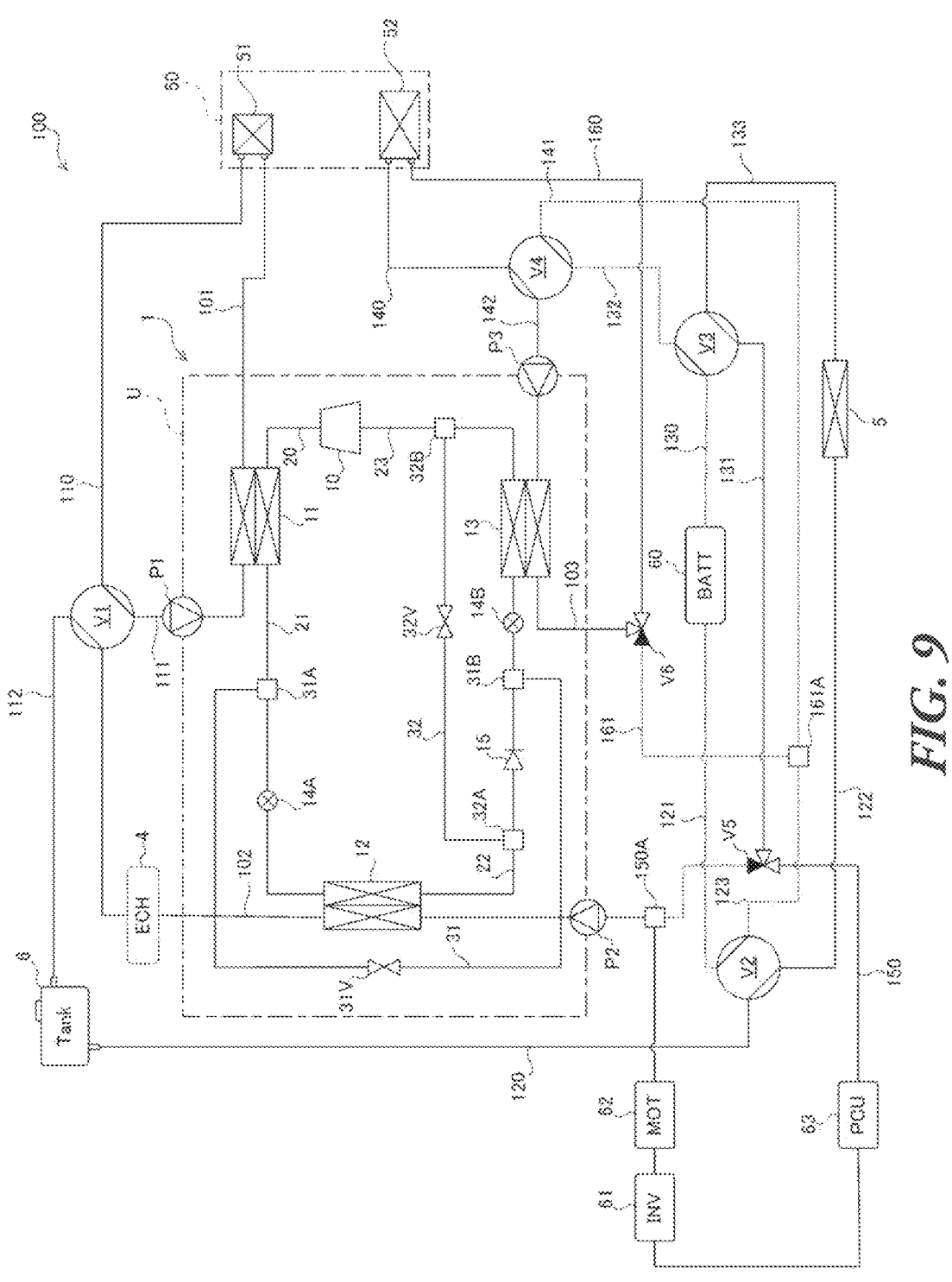
FIG. 9 illustrates operation mode (5)

Operation mode (5) illustrated in FIG. 9 is an operation mode to perform a heating and dehumidifying operation (the temperature adjustment by heat absorption). In the operation mode (5), the refrigerant circuit 1 is constituted by: a first route refrigerant circuit (to bypass the second refrigerant-heat medium heat exchanger 12) in which the bypass refrigerant flow paths 31 and 32 are opened, and the refrigerant from the compressor 10 passes through the first refrigerant-heat medium heat exchanger 11, the bypass refrigerant flow path 31, and the third refrigerant-heat medium heat exchanger 13, and returns to the compressor 10; and a second route refrigerant circuit (to bypass the third refrigerant-heat medium heat exchanger 13) in which the refrigerant from the compressor 10 passes through the first refrigerant-heat medium heat exchanger 11, the second refrigerant-heat medium heat exchanger 12, and the bypass refrigerant flow path 32, and returns to the compressor 10.

In the refrigerant circuit 1, the first refrigerant-heat medium heat exchanger 11 functions as a condenser (the heat release side), the second refrigerant-heat medium heat exchanger 12 functions as an evaporator (the heat absorption side) in the second route refrigerant circuit, and the third refrigerant-heat medium heat exchanger 13 functions as an evaporator (the heat absorption side) in the first route refrigerant circuit.

In the heat medium circuit 100 in the operation mode (5), the heat medium flow paths 101, 102, and 103 form individual circuits, respectively. That is, the heat medium flowing through the heat medium flow path 101 on the heat release side solely enters the heater core 51, exits from the heater core 51, passes through the selector valve V1, and returns to the heat medium flow path 101.

Meanwhile, the heat medium flowing through the heat medium flow path 102 on one of the heat absorption sides passes through the selector valve V1, the tank 6, the selector valve V2, the outdoor heat exchanger 5, the selector valve V3, the selector valve V5, and the temperature-adjusted subject heat exchangers 63, 61, and 62, and returns to the heat medium flow path 102, and the heat medium flowing through the heat medium flow path 103 on the other heat absorption side passes through the selector valve V6, the cooler core 52, and the selector valve V4, and returns to the heat medium flow path 103.

In the operation mode (5), the heat medium flowing through the heat medium flow path 101 on the heat release side solely flows to the heater core 51 to perform the heating operation, and the heat absorption side is distributed between the heat medium flow path 102 running through the second refrigerant-heat medium heat exchanger 12 and the heat medium flow path 103 running through the third refrigerant-heat medium heat exchanger 13 to absorb the heat required for the heating operation from various locations. In addition, the heat medium flowing through the heat medium flow path 103 on the heat absorption side is solely flowed to the cooler core 51 to effectively dehumidify the vehicle compartment.

Figure 10:
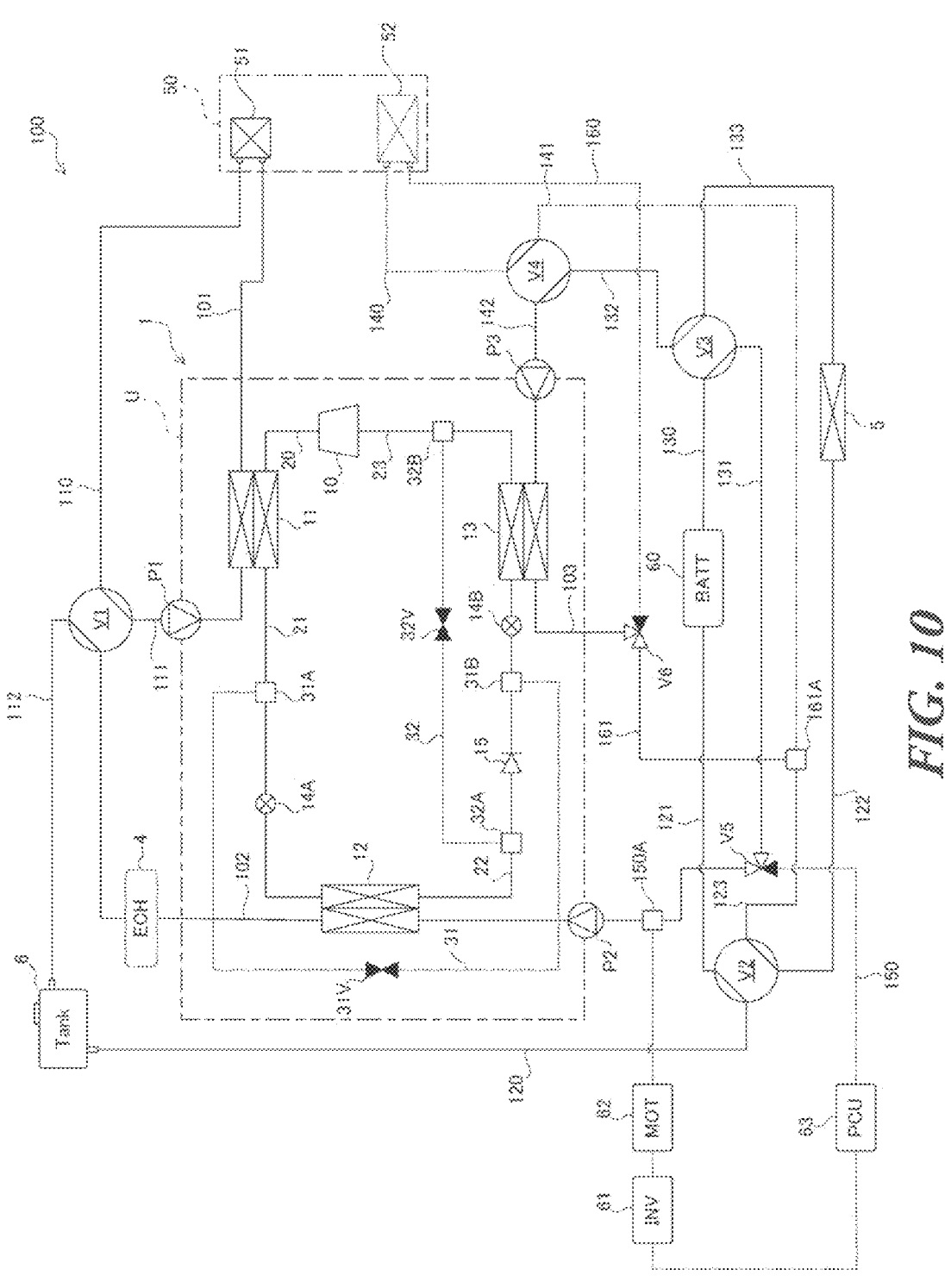
FIG. 10 illustrates operation mode (6)

Operation mode (6) illustrated in FIG. 10 is an operation mode to heat (warm up) the battery while the heating operation of the indoor air conditioner 50 is performed by absorbing the heat from the outdoor air. In the refrigerant circuit 1 in the operation mode (6), the bypass refrigerant flow paths 31 and 32 are closed, the first refrigerant-heat medium heat exchanger 11 and the second refrigerant-heat medium heat exchanger 12 function as condensers (the heat release side), the third refrigerant-heat medium heat exchanger 13 functions as an evaporator (the heat absorption side), the amount of decompression of the decompressors 14A and 14B is adjusted, and the first refrigerant-heat medium heat exchanger 11 and the second refrigerant-heat medium heat exchanger 12 release the heat in stages, in the same way as in the operation mode (4).

In the heat medium circuit 100 in the operation mode (6), the heat medium flow paths 101, 102, and 103 form individual circuits, respectively. The heat medium having a high temperature flowing through the heat medium flow path 101 on the heat release side solely enters the heater core 51, exits from the heater core 51, passes through the selector valve V1, and returns to the heat medium flow path 101.

In addition, the heat medium having a relatively low temperature flowing through the heat medium flow path 102 on the heat release side passes through the selector valve V1, the tank 6, the selector valve V2, the temperature-adjusted subject heat exchanger 60 for the battery, the selector valve V3 and the selector valve V5, and returns to the heat medium flow path 102. Meanwhile, in order to absorb the heat from the outdoor air, the heat medium flowing through the heat medium flow path 103 on the heat absorption side passes through the selector valve V6, the selector valve V2, the outdoor heat exchanger 5, the selector valve V3, and the selector valve V4, and returns to the heat medium flow path 103.

In this case, in the heat medium circuit 100, the selector valve V6 is switched to prevent the heat medium from flowing to the flow path 160, and therefore to prevent the heat medium from flowing to the cooler core 52. In addition, the selector valve V5 is switched to prevent the heat medium from flowing to the flow path 150.

In the operation mode (6), the hot water having a high temperature flowing through the heat medium flow path 101 on one of the heat release sides is flowed to the heater core 51 to perform the heating operation by the indoor air conditioner 50, while the hot water having a relatively low temperature flowing through the heat medium flow path 102 on the other heat release side is flowed to the temperature-adjusted subject heat exchanger 60 for the battery to heat the battery. By this means, it is possible to generate the heat mediums having different temperature ranges in the refrigerant circuit 1, and therefore to efficiently perform the heating operation and heat the battery at desired temperatures.

Figure 11:
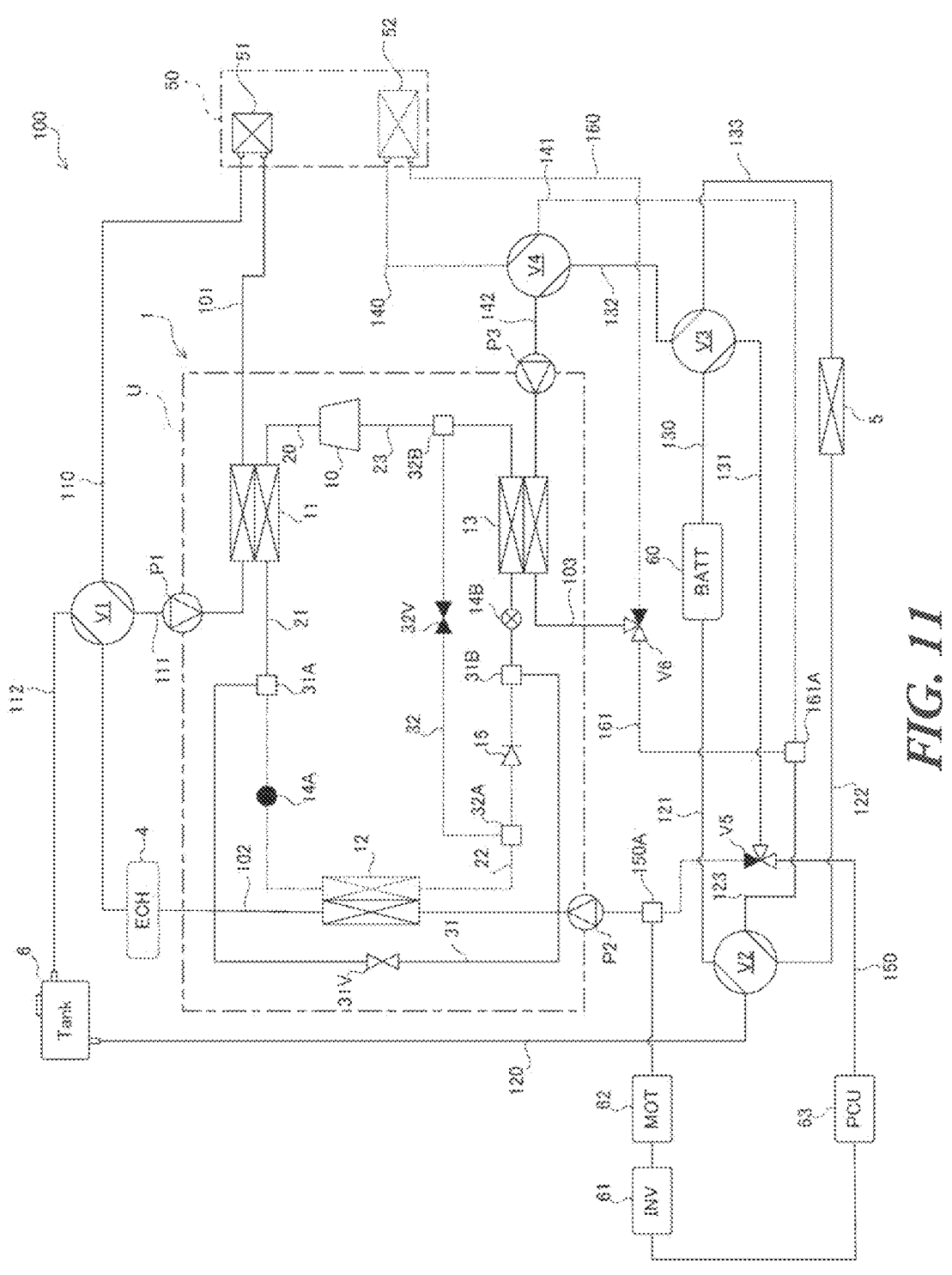
FIG. 11 illustrates operation mode (7)

Operation mode (7) illustrated in FIG. 11 is an operation mode to accumulate and discharge the heat of the temperature-adjusted subjects such as the battery while the heating operation of the indoor air conditioner 50 is performed by absorbing the heat from the outdoor air. In the refrigerant circuit 1 in the operation mode (7), the bypass refrigerant flow path 31 is opened, the bypass refrigerant flow path 32 is closed, and the decompressor 14A is closed to form a circuit (to bypass the second refrigerant-heat medium heat exchanger 12) in which the refrigerant from the compressor 10 passes through the first refrigerant-heat medium heat exchanger 11, the bypass refrigerant flow path 31, and the third refrigerant-heat medium heat exchanger 13, and returns to the compressor 10.

In the refrigerant circuit 1, the first refrigerant-heat medium heat exchanger 11 functions as a condenser (the heat release side), the third refrigerant-heat medium heat exchange 13 functions as an evaporator (the heat absorption side), and the second refrigerant-heat medium heat exchanger 12 is out of the refrigerant circuit 1.

In the heat medium circuit 100 in the operation mode (7), the heat medium flow paths 101, 102 and 103 form individual circuits, respectively, and the heat medium flowing through the heat medium flow path 101 on the heat release side solely enters the heater core 51, exits from the heater core 51, passes through the selector valve V1 and returns to the heat medium flow path 101.

In addition, the heat medium flowing through the heat medium flow path 102 passes through the selector valve V1, the tank 6, the selector valve V2, the temperature-adjusted subject heat exchanger 60 for the battery, the selector valve V3, the selector valve V5, and the other temperature-adjusted subject heat exchangers 63, 61 and 62, and returns to the heat medium flow path 102. In this case, the second refrigerant-heat medium heat exchanger 12 is out of the refrigerant circuit 1, and there is no heat exchange in the second refrigerant-heat medium heat exchanger 12. Meanwhile, in order to absorb the heat from the outdoor air, the heat medium flowing through the heat medium flow path 103 on the heat absorption side passes through the selector valve V6, the selector valve V2, the outdoor heat exchanger 5, the selector valve V3 and the selector valve V4, and returns to the heat medium flow path 103.

In the operation mode (7), while the heating operation of the indoor air conditioner 50 is performed by absorbing the heat from the outdoor air, the heat medium flows through the temperature-adjusted subject heat exchangers 60, 61, 62, and 63 in a circuit separated from the refrigerant circuit 1, and the tank 6 for accumulating or discharging the heat is provided in the separated circuit. By this means, it is possible to efficiently accumulate and discharge the heat of the temperature-adjusted subjects such as the battery.

Figure 12:
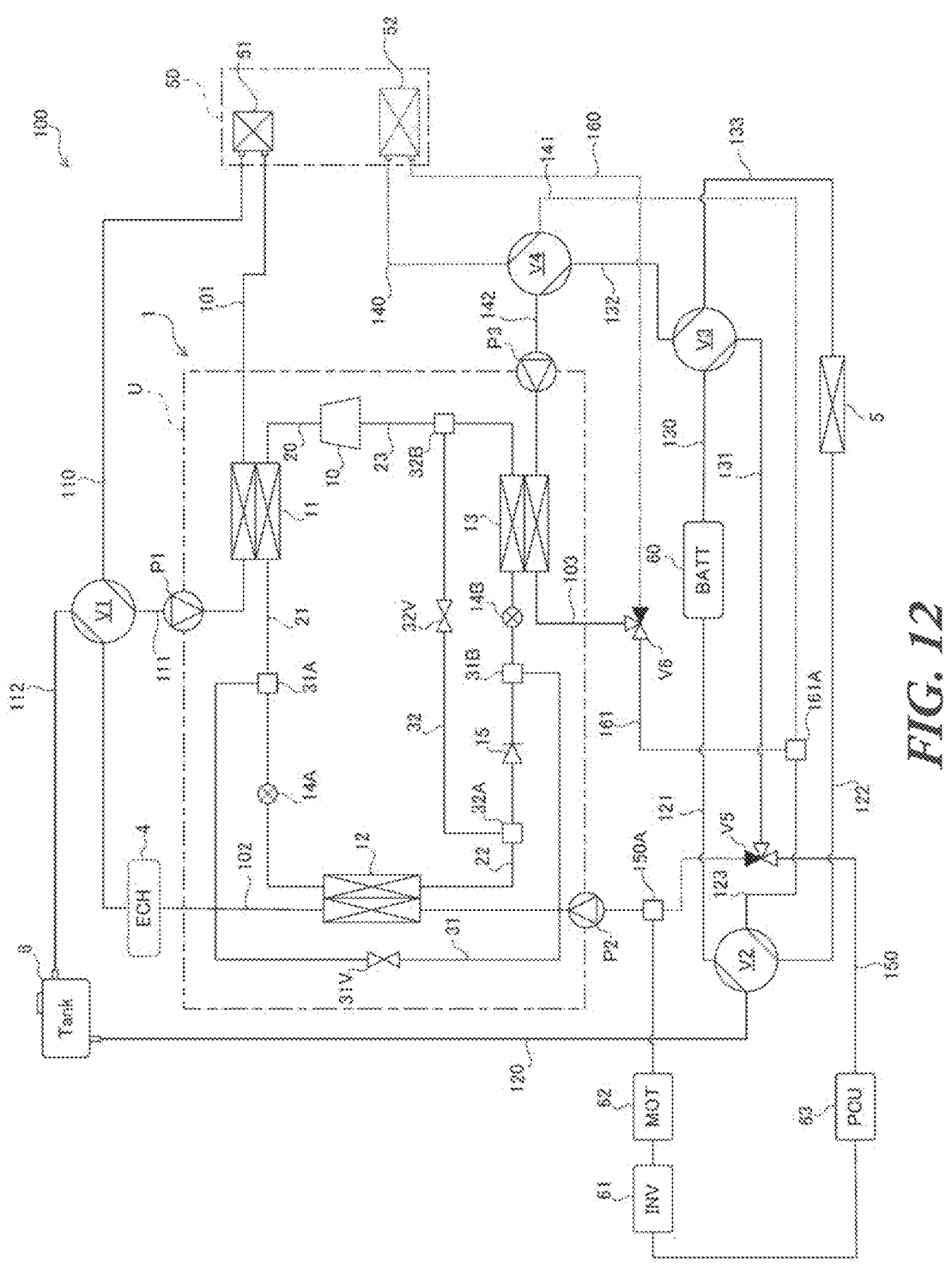
FIG. 12 illustrates operation mode (8)

Operation mode (8) illustrated in FIG. 12 is an operation mode to use the heat accumulated in the temperature-adjusted subjects such as the battery while the heating operation of the indoor air conditioner 50 is performed by absorbing the heat from the outdoor air. In the refrigerant circuit 1 in the operation mode (8), the bypass refrigerant flow paths 31 and 32 are opened, and a refrigerant circuit is constituted by the first route refrigerant circuit to bypass the second refrigerant-heat medium heat exchanger 12, and the second route refrigerant circuit to bypass the third refrigerant-heat medium heat exchanger 13 in the same way as in the operation mode (5).

In the heat medium circuit 100 in the operation mode (8), the heat medium flow paths 101, 102, and 103 form individual circuits, respectively, and the heat medium flowing through the heat medium flow path 101 on the heat release side solely enters the heater core 51, exits from the heater core 51, passes through the selector valve V1, and returns to the heat medium flow path 101. Meanwhile, in order to absorb the heat from the outdoor air, the heat medium flowing through the heat medium flow path 103 on the heat absorption side passes through the selector valve V6, the selector valve V2, the outdoor heat exchanger 5, the selector valve V3, and the selector valve V4 and returns to the heat medium flow path 103.

In addition, the heat medium flowing through the heat medium flow path 102 on the heat absorption side passes through the selector valve V1, the tank 6, the selector valve V2, the temperature-adjusted subject heat exchanger 60 for the battery, the selector valve V3, the selector valve V5, and the other temperature-adjusted subject heat exchangers 63, 61 and 62, and returns to the heat medium flow path 102. Here, the second refrigerant-heat medium heat exchanger 12 on the heat absorption side absorbs the heat accumulated in the tank 6 and the temperature-adjusted subjects such as the battery in the operation mode (6), and therefore to obtain the heat required for the heating operation, together with absorbing the heat from the outdoor air.

Figure 13:
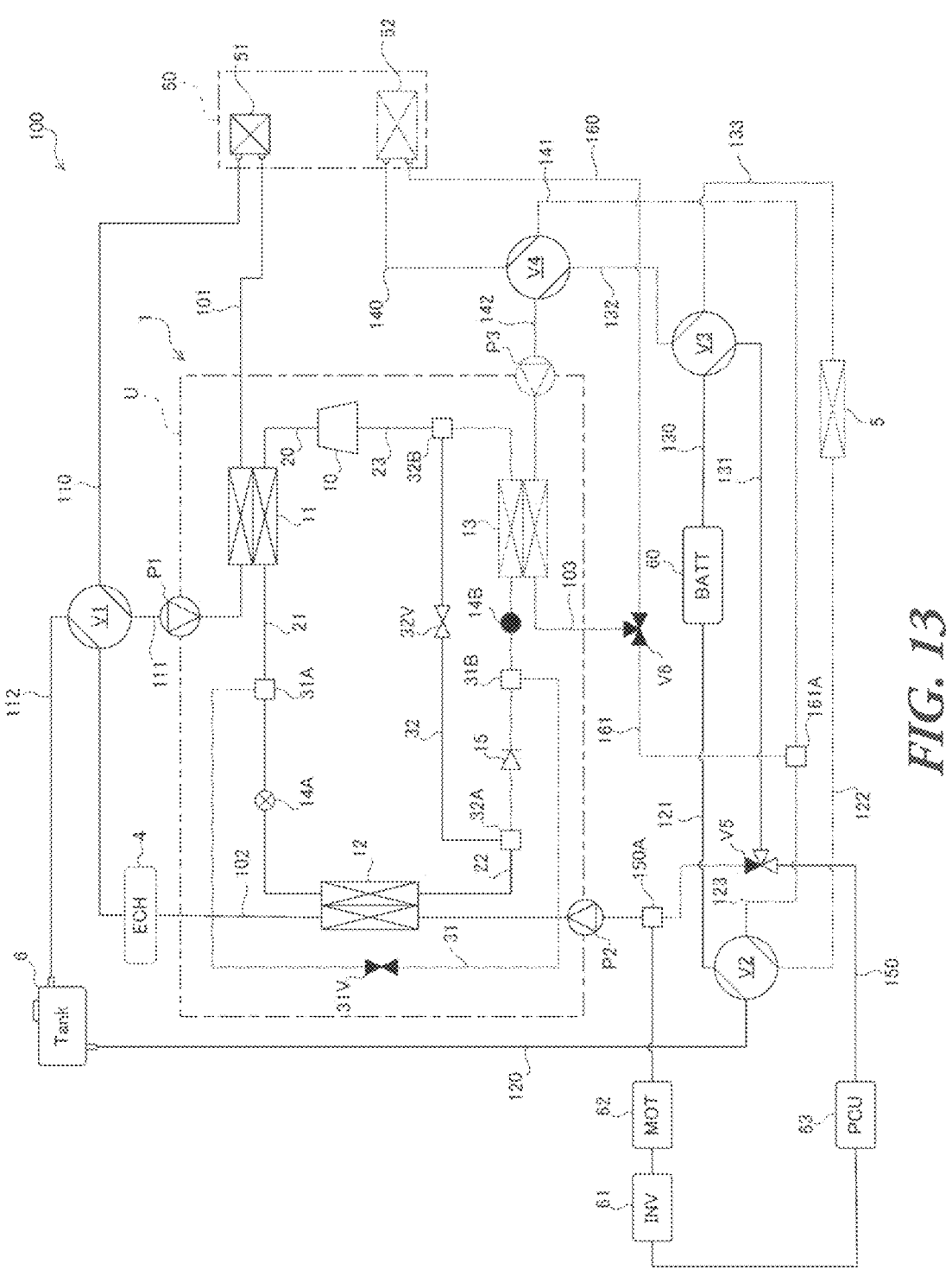
FIG. 13 illustrates operation mode (9)

Operation mode (9) illustrated in FIG. 13 is an operation mode to perform the heating operation of the indoor air conditioner 50 by using the accumulated heat. In the refrigerant circuit 1 in the operation mode (9), the bypass refrigerant flow path 31 is closed, the bypass refrigerant flow path 32 is opened, and the decompressor 14B is closed to form a refrigerant circuit to bypass the third refrigerant-heat medium heat exchanger 13. In this case, the third refrigerant-heat medium heat exchanger 13 is out of the refrigerant circuit 1, and therefore the heat medium flow path 103 running through the third refrigerant-heat medium heat exchanger 13 and the flow path to flow the heat medium to the heater core 52 are not used.

In the heat medium circuit 100 in the operation mode (9), the heat medium flow path 101 and the heat medium flow path 102 form individual circuits, respectively, and the heat medium flowing through the heat medium flow path 101 on the heat release side solely enters the heater core 51, exits from the heater core 51, passes through the selector valve V1, and returns to the heat medium flow path 101.

The heat medium flowing through the heat medium flow path 102 on the heat absorption side passes through the selector valve V1, the tank 6, the selector valve V2, the temperature-adjusted subject heat exchanger 60 for the battery, the selector valve V3, the selector valve V5, and the other temperature-adjusted subject heat exchangers 63, 61 and 62, and returns to the heat medium flow path 102, in the same way as in the operation mode (8). Here, the heat accumulated in the tank 6 and the temperature-adjusted subjects such as the battery is absorbed in the heat medium flow path 102 on the heat absorption side of the refrigerant circuit 1 to perform the heating operation in the operation mode (6).

Figure 14:
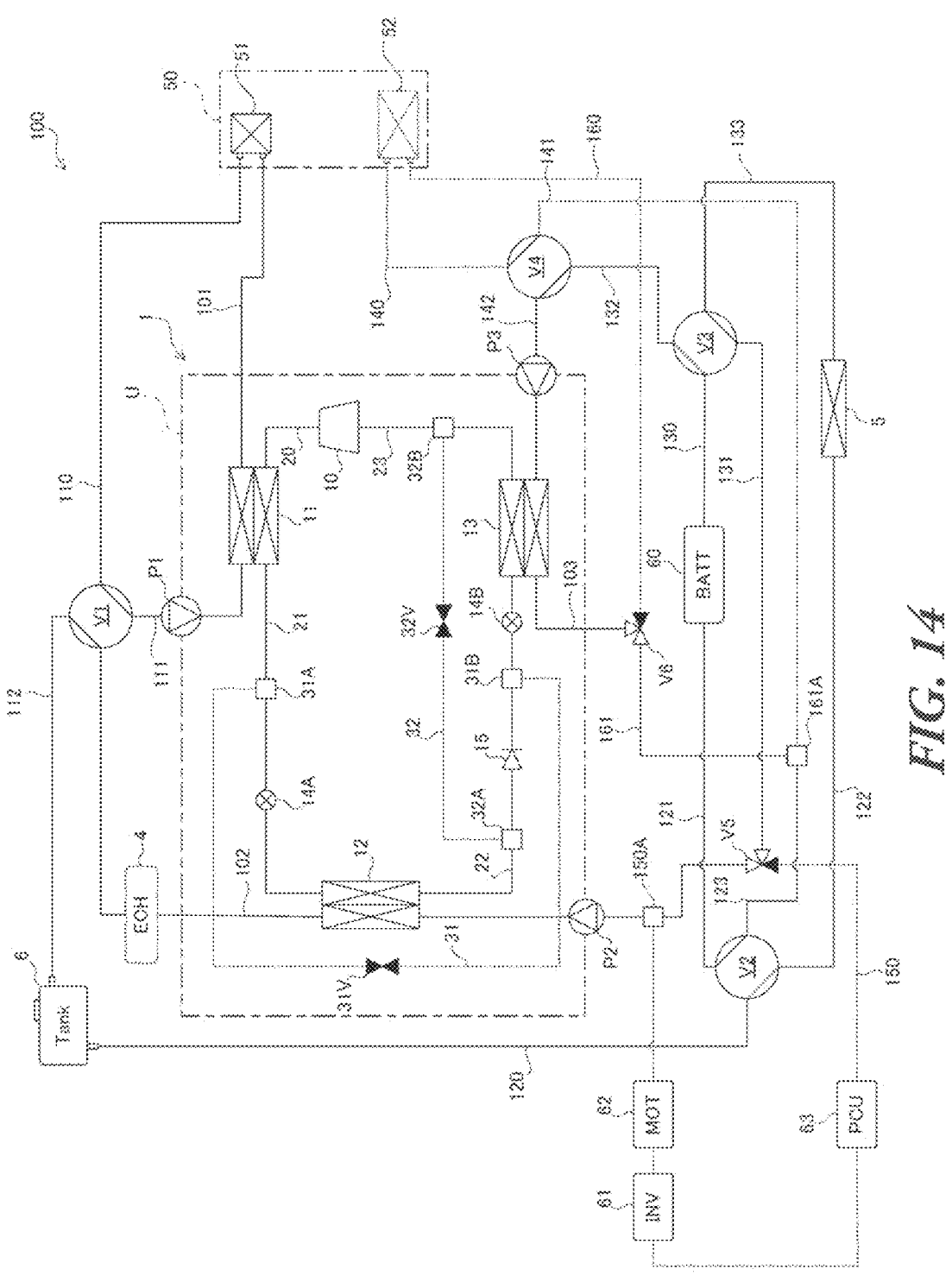
FIG. 14 illustrates operation mode (10)

Operation mode (10) illustrated in FIG. 14 is an operation mode to perform a heating and defrosting operation by using the accumulated heat while the vehicle is stopped. In the refrigerant circuit 1 in the operation mode (10), the bypass refrigerant flow paths 31 and 32 are closed, the first refrigerant-heat medium heat exchanger 11 and the second refrigerant-heat medium heat exchanger 12 function as condensers (the heat release side), and the third refrigerant-heat medium heat exchanger 13 functions as an evaporator (the heat absorption side), in the same way as in the operation mode (4) and so forth.

In the heat medium circuit 100 in the operation mode (10), the heat medium flow paths 101, 102, and 103 form individual circuits, respectively, and the heat medium flowing through the heat medium flow path 101 on the heat release side enters the heater core 51, exits from the heater core 51, passes through the selector valve V1, and returns to the heat medium flow path 101. The heat medium flowing through the heat medium flow path 102 on the heat release side passes through the selector valve V1, the tank 6, the selector valve V2, the outdoor heat exchanger 5, the selector valve V3, and the selector valve V5, and returns to the heat medium flow path 102. The heat medium flowing through the heat medium flow path 103 on the heat absorption side passes through the selector valve V6, the selector valve V2, the temperature-adjusted subject heat exchanger 60 for the battery, the selector valve V3, and the selector valve V4, and returns to the heat medium flow path 103.

In the operation mode (10), the heat accumulated in the battery is absorbed in the third refrigerant-heat medium heat exchanger 13 to operate the refrigerant circuit 1, and the heat medium heated by the heat released in the second refrigerant-heat medium heat exchanger 12 and the heat accumulated in the tank 6 are flowed to the outdoor heat exchanger 5 to defrost the outdoor heat exchanger 5.

Figure 15:
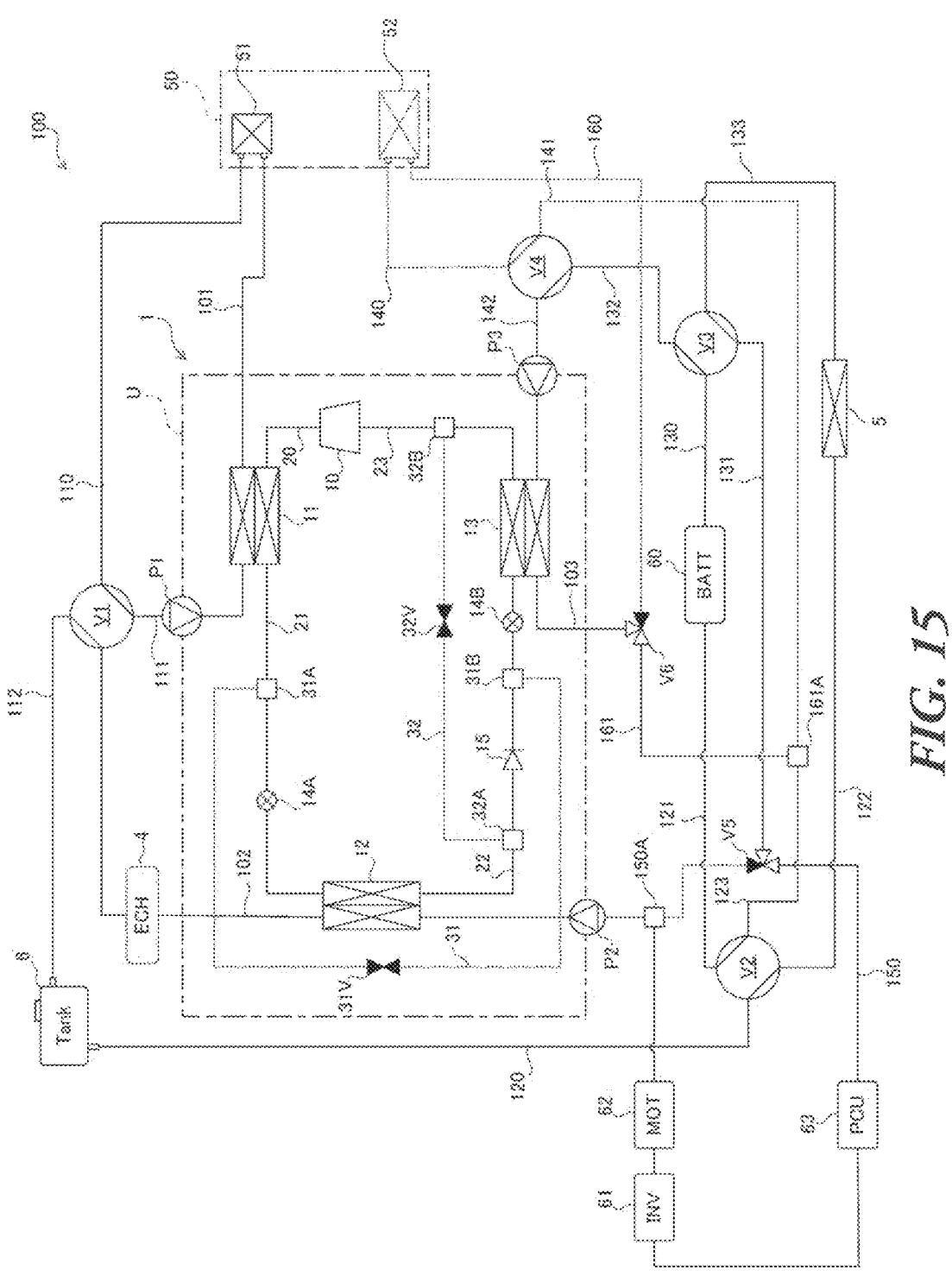
FIG. 15 illustrates operation mode (11)

Operation mode (11) illustrated in FIG. 15 is an operation mode to perform the heating and defrosting operation by using the accumulated heat while the vehicle is moving. The operation mode (11) is the same as the operation mode (10) except for the switching state of the selector valve V5. In the operation mode (11), the heat of the temperature-adjusted subjects (the inverter, the motor, the power control unit and so forth) generated while the vehicle is driven, the heat released in the second refrigerant-heat medium heat exchanger 12, and the heat accumulated in the tank 6 are used to defrost the outdoor heat exchanger 5.

Figure 16:
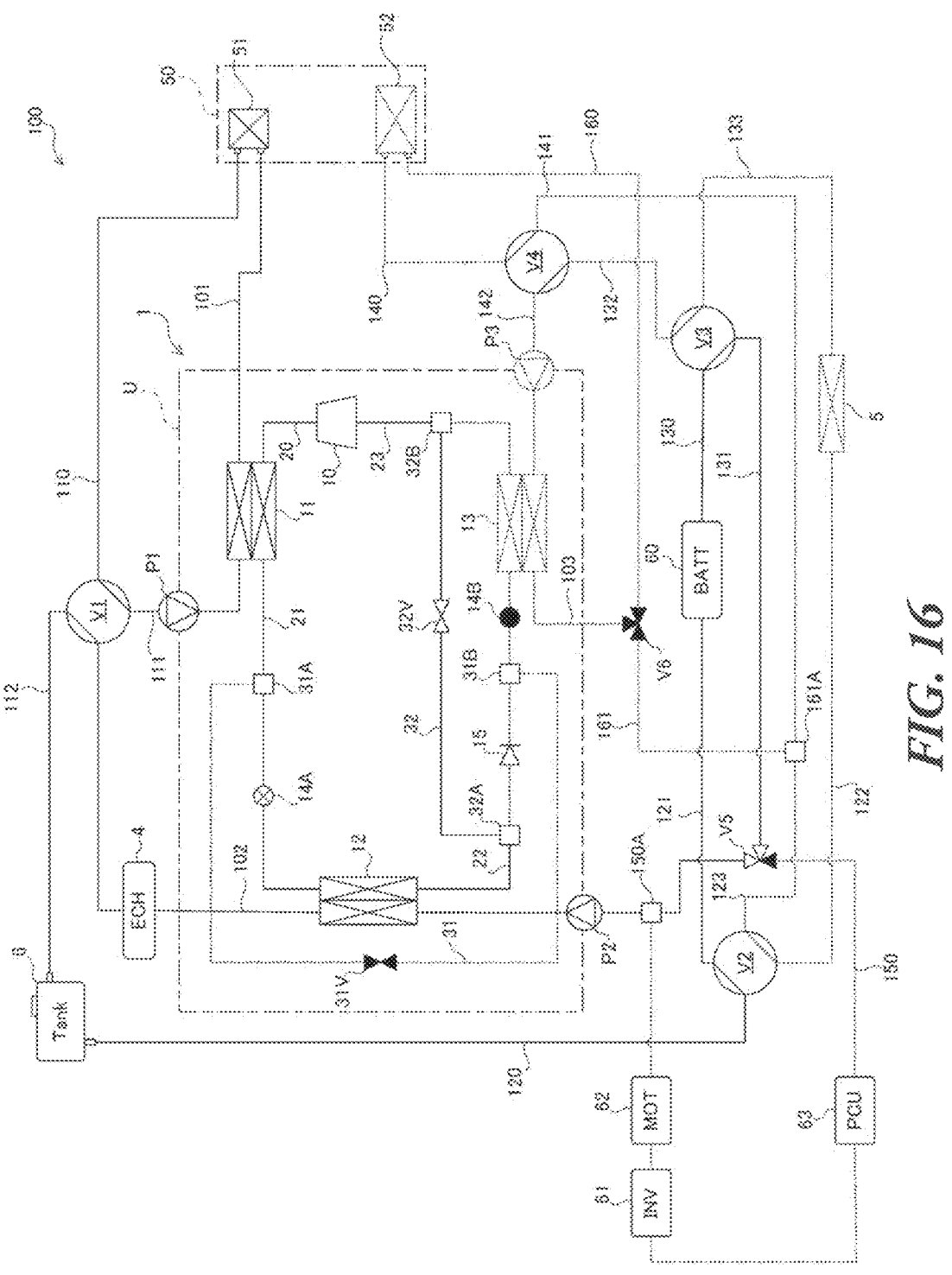
FIG. 16 illustrates operation mode (12)

Operation mode (12) illustrated in FIG. 16 is an operation mode to heat the battery while the heating operation of the indoor air conditioner 50 is performed by absorbing the heat of the auxiliary heater 4 to operate the refrigerant circuit. The operation mode (12) is the same as the operation mode (9) except for the switching of the selector valve V5.

In the heat medium circuit 100 in the operation mode (12), the heat medium flow path 101 and the heat medium flow path 102 form individual circuits, respectively, and the heat medium flowing through the heat medium flow path 101 on the heat release side enters the heater core 51, exits from the heater core 51, passes through the selector valve V1, and returns to the heat medium flow path 101.

Meanwhile, the heat medium flowing through the heat medium flow path 102 on the heat absorption side is heated by the auxiliary heater 4, passes through the selector valve V1, the tank 6, the selector valve V2, the temperature-adjusted subject heat exchanger 60, the selector valve V3, and the selector valve V5, and returns to the heat medium flow path 102. In this case, the heat added by the auxiliary heater 4 is absorbed into the refrigerant in the second refrigerant-heat medium heat exchanger 12, and the battery is heated in the temperature-adjusted subject heat exchanger 60 by the heat added by the auxiliary heater 4 and the heat accumulated in the tank 6.

Here, the temperature of the heat medium used to heat the battery can be appropriately adjusted depending on the amount of heat generated by the auxiliary heater 4, and therefore can be adjusted to a temperature range different from the temperature of the heat medium flowing through the individual heat medium flow path 101 on the heat release side. By this means, it is possible to heat the battery while the heating operation is performed at an appropriate temperature.

Figure 17:
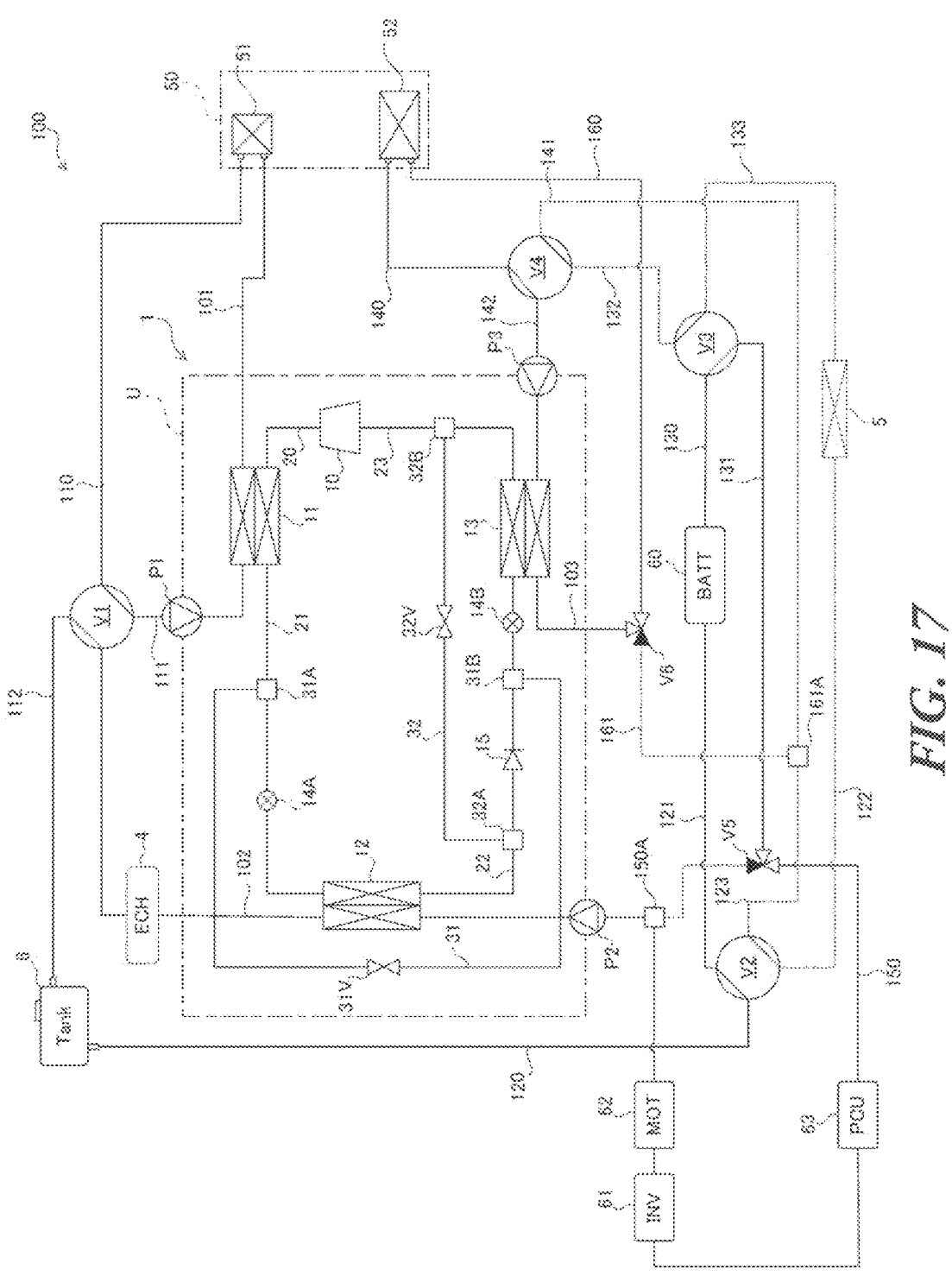
FIG. 17 illustrates operation mode (13)

Operation mode (13) illustrated in FIG. 17 is an operation mode to perform the heating operation of the indoor air conditioner 50 by the operation of the refrigerant circuit to absorb the heat in the vehicle compartment and the heat discharged from and accumulated in the temperature-adjusted subjects while adding the heat of the auxiliary heater 4.

The refrigerant circuit 1 in the operation mode (13) is the same as that in the operation mode (8). That is, the bypass refrigerant flow paths 31 and 32 are opened, and the refrigerant circuit is constituted by the first route refrigerant circuit to bypass the second refrigerant-heat medium heat exchanger 12 and the second route refrigerant circuit to bypass the third refrigerant-heat medium heat exchanger 13.

In the heat medium circuit 100 in the operation mode (13), the heat medium flow paths 101, 102, and 103 form individual circuits, respectively, and the heat medium flowing through the heat medium flow path 101 on the heat release side enters the heater core 51, exits from the heater core 51, passes through the selector valve V1, and returns to the heat medium flow path 101.

Meanwhile, the heat medium flowing through the heat medium flow path 102 on the heat absorption side is heated by the auxiliary heater 4, passes through the selector valve V1, the tank 6, the selector valve V2, the temperature-adjusted subject heat exchanger 60, the selector valve V3, the selector valve V5, and the temperature-adjusted subject heat exchangers 63, 61, and 62, and returns to the heat medium flow path 102. In addition, the heat medium flowing through the heat medium flow path 103 on the heat absorption side passes through the selector valve V6, the cooler core 52, and the selector valve V4, and returns to the heat medium flow path 103.

In the operation mode (13), the heat in the vehicle compartment collected via the cooler core 52 is absorbed into the refrigerant in the third refrigerant-heat medium heat exchanger 13 which functions as an evaporator in the first route refrigerant circuit, and the heat added by the auxiliary heater 4, the heat accumulated in the tank 6, and the heat accumulated in and discharged from the temperature-adjusted subjects such as the battery are absorbed into the refrigerant in the second refrigerant-heat medium heat exchanger 12 which functions as an evaporator in the second route refrigerant circuit.

<Direct Air Conditioning by Refrigerant>

Figure 18:
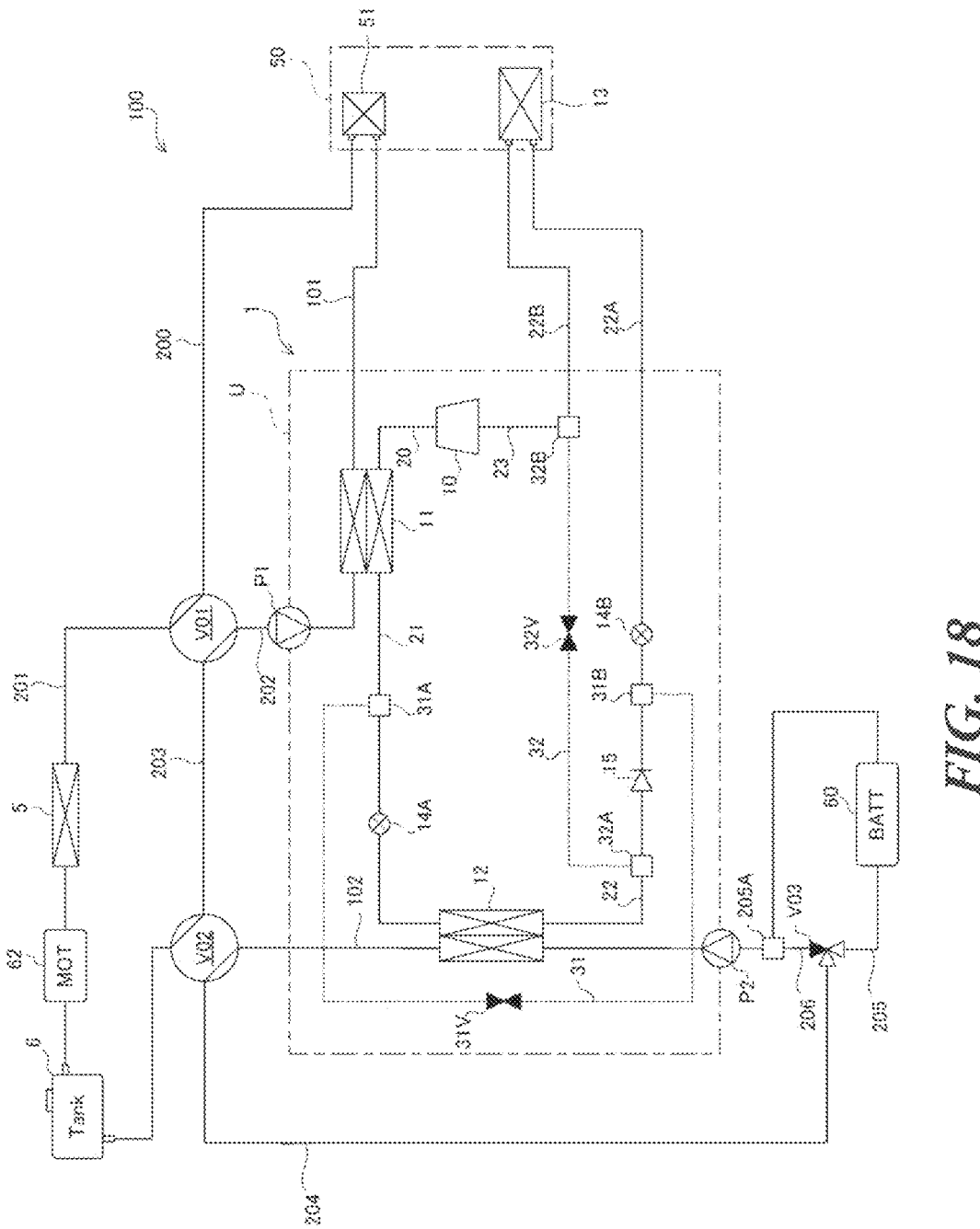
FIG. 18 illustrates the vehicle heat management system according to another embodiment of the invention.

FIG. 18 illustrates an example of the vehicle heat management system according to another embodiment of the invention. It is different from the above-described embodiment that one of the selected heat exchangers of the refrigerant circuit 1 functions an evaporator used as a vehicle compartment air conditioning heat exchanger. That is, with the illustrated example, refrigerant flow paths 22A and 22B are drawn from the unit U, so that the third refrigerant-heat medium heat exchanger 13 is disposed outside the unit U as a cooler core of the indoor air conditioner 50.

The illustrated state shows an operation mode to cool the battery while the cooling operation is performed by the indoor air conditioner 50. Here, in the refrigerant circuit 1, the bypass refrigerant flow path 31 and the bypass refrigerant flow path 32 are closed, the first refrigerant-heat medium heat exchanger 11 in the unit U functions as a condenser (the heat release side), the second refrigerant-heat medium heat exchanger 12 in the unit U functions as an evaporator (the heat absorption side), and the third refrigerant-heat medium heat exchanger 13 provided in the indoor air conditioner 50 outside the unit U functions as an evaporator (the heat absorption side).

With the present embodiment, the heat medium circuit 100 includes a selector valve V01 and a selector valve V02 configured to switch between a circuit state where the heat medium flow path 101 running through the first refrigerant-heat medium heat exchanger 11 and the heat medium flow path 102 running through the second refrigerant-heat medium heat exchanger 12 form individual circuits, respectively, and a circuit state where the heat medium having passed through the second refrigerant-heat medium heat exchanger flows to the first refrigerant-heat medium heat exchanger 11. The heat medium circuit 100 also includes a selector valve V03 configured to switch to select whether the heat medium flowing through the second refrigerant-heat medium heat exchanger 12 flows to the temperature-adjusted subject heat exchanger 60 for the battery.

With the illustrated example, the heat medium flowing through the flow path 101 on the heat release side is circulated in an individual circuit in which the heat medium enters the heater core 51, flows to a flow path 200, enters the selector valve V01, passes through the outdoor heat exchanger 5, the temperature-adjusted subject heat exchanger 62, and the tank 6 in a flow path 201, enters the selector valve V02, flows to a flow path 203, passes through the selector valve V01, passes through a flow path 202, and returns to the heat medium flow path 101.

Meanwhile, the heat medium flow path 102 on the heat absorption side is circulated in an individual circuit in which the heat medium enters the selector valve V02, flows through a flow path 204, enters the selector valve V03, passes through the temperature-adjusted subject heat exchanger 60 for the battery in a flow path 205, and returns to the heat medium flow path 102.

In the illustrated circuit state according to the embodiment, the cooling operation of the indoor air conditioner 50 is performed by directly absorbing the heat into the refrigerant in the third refrigerant-heat medium heat exchanger 13 and adjusting the temperature by the heat medium flowing through the heat medium flow path 101 on the heat release side. In addition, the battery is cooled in the individual circuit for the heat medium flowing through the heat medium flow path 102 on the heat absorption side. In this case, the amount of the heat absorption in the second refrigerant-heat medium heat exchanger 12 from the heat medium flow path 102 is reduced by the decompressor 14A reducing the pressure in stages. By this means, the battery is efficiently cooled by appropriately absorbing the heat while the heat is effectively absorbed for the cooling operation.

With the embodiment illustrated in FIG. 18, the selector valves V01, V02, and V03 are appropriately switched so that the heat mediums have appropriate temperature ranges. Therefore, it is possible to improve the heat efficiency of the operation modes of the heating operation and the operation to heat (warm up) the battery.

<Placement of Auxiliary Heater>

As described above, the auxiliary heater 4 provided in the heat medium circuit 100 is disposed preferably on the inlet side or the outlet side of the first, second, and third refrigerant-heat medium heat exchangers 11, 12, and 13. By appropriately disposing the auxiliary heater 4, it is possible to exert the desired function in the above-described operation modes.

First, as illustrated in the embodiments described above, when the auxiliary heater 4 is provided on the outlet side or the inlet side of the second refrigerant-heat medium heat exchanger 12, the heat of the auxiliary heater 4 is absorbed to operate the refrigerant circuit 1, so that the heating operation in a low-temperature environment can be performed in the operation mode (12) illustrated in FIG. 16.

Here, when the auxiliary heater 4 is provided on the outlet side of the second refrigerant-heat medium heat exchanger 12, the heat medium heated by the auxiliary heater 4 flows through the circulating flow path in which the heat medium passes through the selector valve V1, enters the tank 6, passes through the selector valve V2, the temperature-adjusted subject heat exchanger 60, the selector valve V3, and the selector valve V5, and returns to the heat medium flow path 102, as illustrated in FIG. 16. In this circulating flow path, it is possible to absorb the heat discharged from the battery or the motor in the temperature-adjusted subject heat exchanger 60. By this means, it is possible to achieve the heat pump having COP (coefficient of performance) greater than 1, and also possible to adjust the temperature of the battery at the optimum temperature adjusted by the auxiliary heater 4 via the temperature-adjusted subject heat exchanger 60.

In this case, when the auxiliary heater 4 is provided on the inlet side of the second refrigerant-heat medium heat exchanger 12, the heat medium heated by the auxiliary heater 4 flows through the circulating flow path in the same way as described above. Here, the heat medium heated by the auxiliary heater 4 directly enters the second refrigerant-heat medium heat exchanger 12, and therefore the amount of the heat absorption into the refrigerant circuit 1 on the low-pressure side can be adjusted directly by the auxiliary heater 4. By this means, it is possible to improve the heat efficiency of the temperature adjustment for the heating operation.

Figure 19:
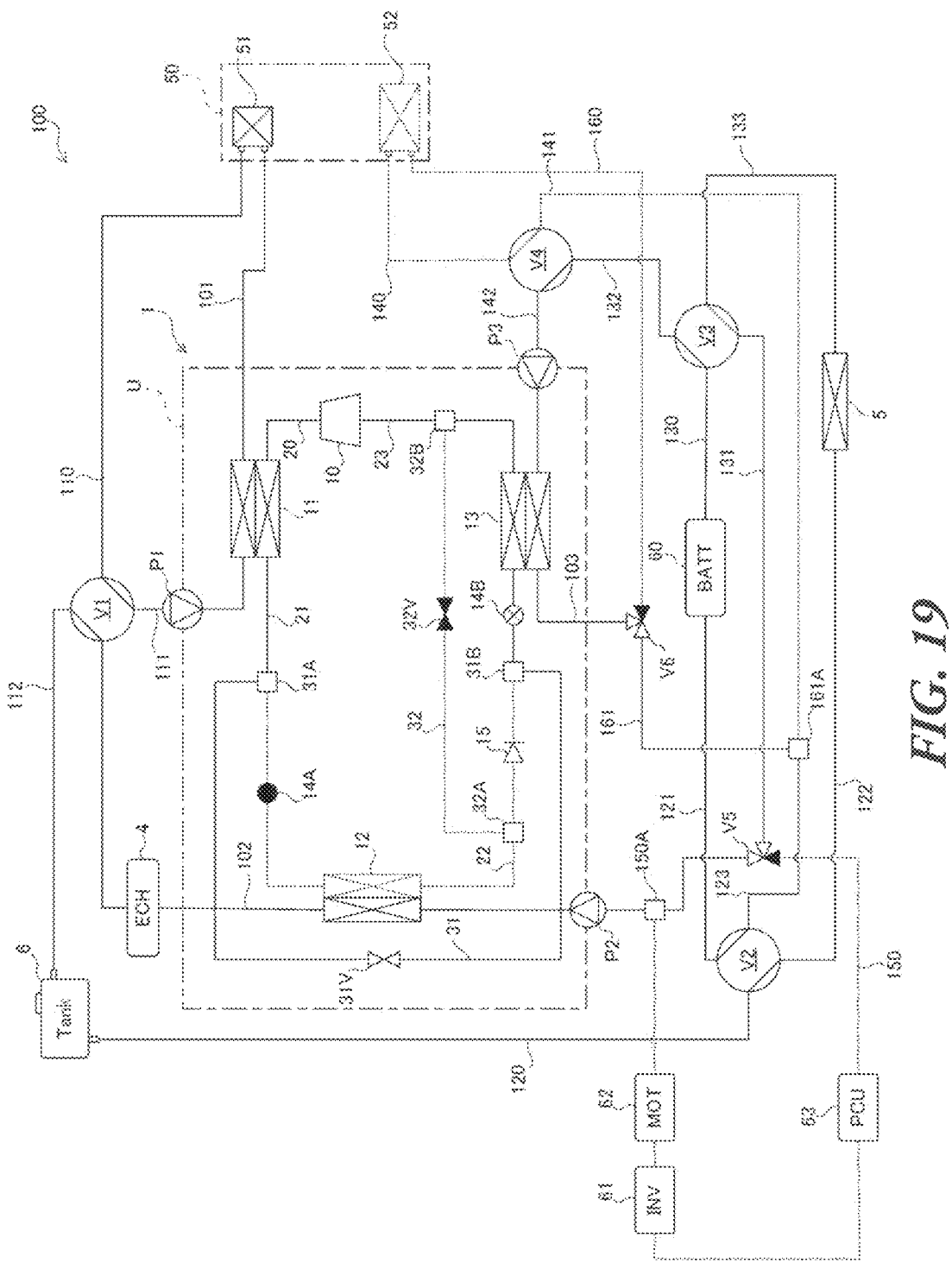
FIG. 19 illustrates an example of the placement of an auxiliary heater.

FIG. 19 illustrates another example of the operation when the auxiliary heater 4 is provided on the outlet side or the inlet side of the second refrigerant-heat medium heat exchanger 12. FIG. 19 illustrates an example where the outdoor heat exchanger 5 is defrosted during the operation mode (7) illustrated in FIG. 11 in which the heating operation by collecting the accumulated heat is performed.

Here, by switching the selector valve V2, the heat medium heated by the auxiliary heater 4 flows through the circulating flow path in which the heat medium passes through the selector valve V1, enters the tank 6, passes through the selector valve V2, the outdoor heat exchanger 5, the selector valve V3, and the selector valve V5, and returns to the heat medium flow path 102. With use of the heat medium flowing through this circulating flow path, it is possible to defrost the outdoor heat exchanger 5 during the heating operation by collecting the accumulated heat. In this case, it is possible to achieve the equivalent function in either case of the auxiliary heater 4 disposed on the outlet side or the inlet side of the second refrigerant-heat medium heat exchanger 12.

Figure 20:
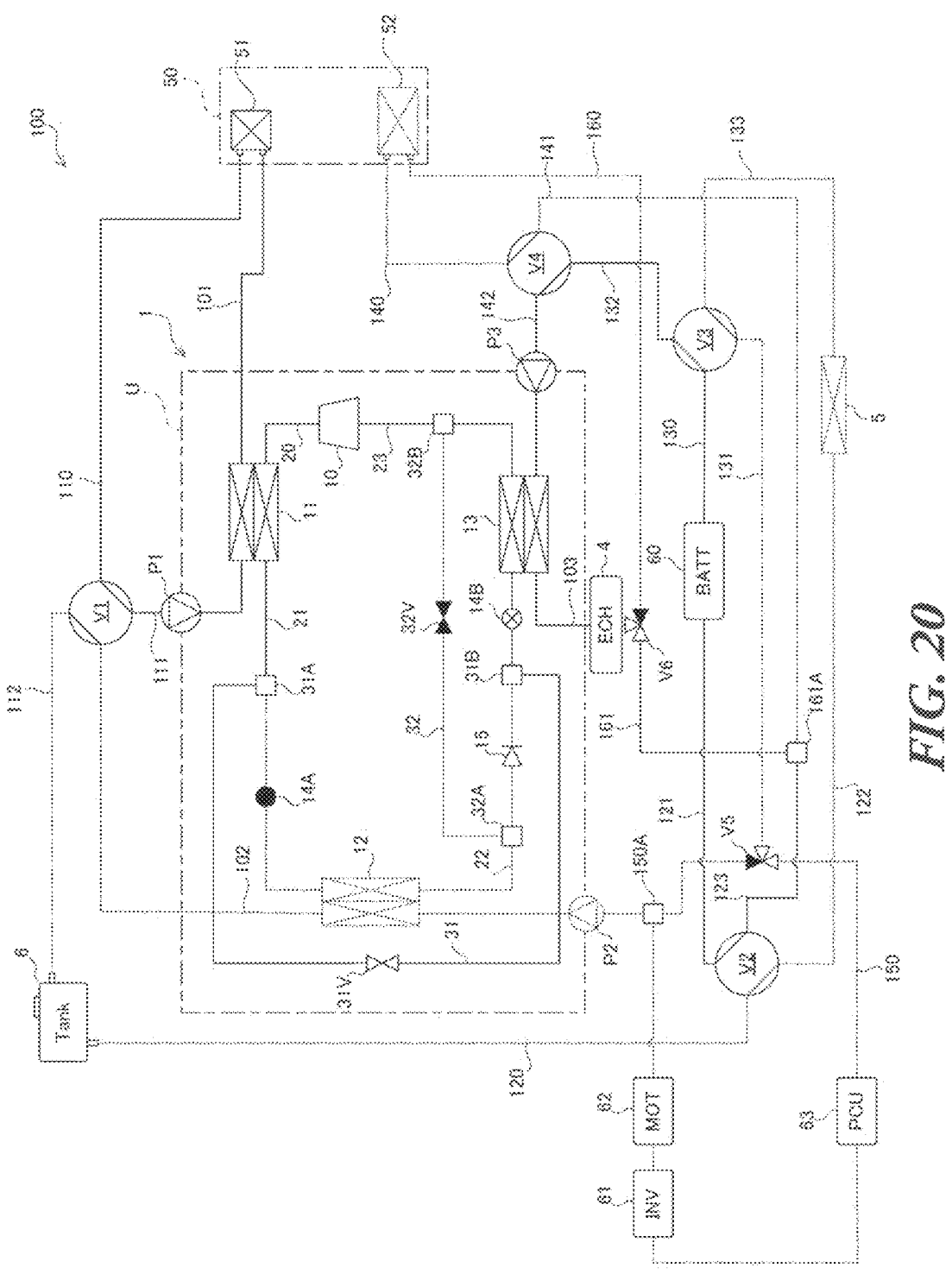
FIG. 20 illustrates another example of the placement of the auxiliary heater.

FIG. 20 illustrates an example of the operation when the auxiliary heater 4 is provided on the outlet side of the third refrigerant-heat medium heat exchanger 13. Here, in the operation mode (7) illustrated in FIG. 11, the selector valve V2 and the selector valve V3 are switched, and therefore the heat medium having exited from the third refrigerant-heat medium heat exchanger 13 flows through the circulating flow path in which the heat medium heated by the auxiliary heater 4, passes through the selector valve V6, the selector valve V2, the temperature-adjusted subject heat exchanger 60, the selector valve V3, and the selector valve V4, and returns to the heat medium flow path 103.

The heat of the heat medium heated by the auxiliary heater 4 and flowing through the circulating flow path is absorbed in the third refrigerant-heat medium heat exchanger 13 of the refrigerant circuit 1 on the low-pressure side, and the heat is released to the heat medium flowing through the heat medium flow path 101 in the first refrigerant-heat medium heat exchanger 11 of the refrigerant circuit 1 on the high-pressure side, and the heat is supplied to the heater core 51 for the heating operation. By this means, even in the low-temperature environment, it is possible to absorb the heat supplied from the auxiliary heater 4 into the refrigerant circuit 1 to perform the heating operation. In this case, the temperature-adjusted subject heat exchanger 60 is provided in the circulating flow path, and therefore it is possible also to adjust the temperature of the battery together.

With this example of the operation, when the auxiliary heater 4 is provided on the outlet side of the third refrigerant-heat medium heat exchanger 13, it is possible to adjust the temperature of the battery via the temperature-adjusted subject heat exchanger 60 directly by the heat the auxiliary heater 4. Meanwhile, when the auxiliary heater 4 is provided on the inlet side of the third refrigerant-heat medium heat exchanger 13, the auxiliary heater 4 can directly adjust the heat absorption into the refrigerant circuit 1 on the low pressure side.

Figure 21:
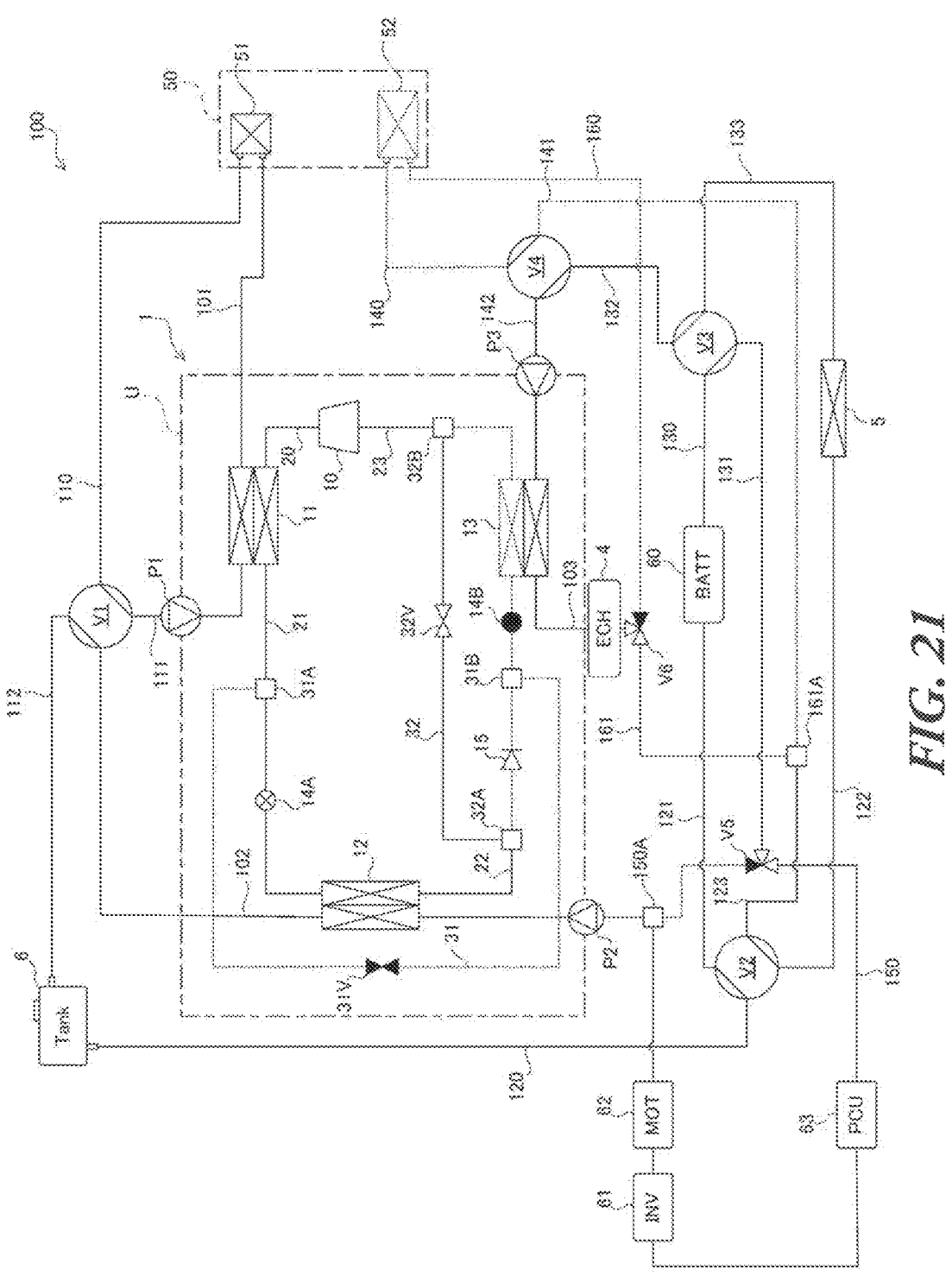
FIG. 21 illustrates another example of the placement of the auxiliary heater.

FIG. 21 illustrates another example of the operation when the auxiliary heater 4 is provided on the outlet side of the third refrigerant-heat medium heat exchanger 13. This example illustrates an operation where the outdoor heat exchanger 5 is defrosted with use of the heat of the auxiliary heater 4 during the heating operation by collecting the accumulated heat in the operation mode (9) illustrated in FIG. 13.

With this example, the heat medium heated by the auxiliary heater 4 is circulated independent of the refrigerant circuit 1 such that the heat medium passes through the selector valve V6, the selector valve V2, the outdoor heat exchanger 5, the selector valve V3, and the selector valve V4 to defrost the outdoor heat exchanger 5. In this case, it is possible to achieve the equivalent function in either case of the auxiliary heater 4 disposed on the outlet side or the inlet side of the third refrigerant-heat medium heat exchanger 13.

Figure 22:
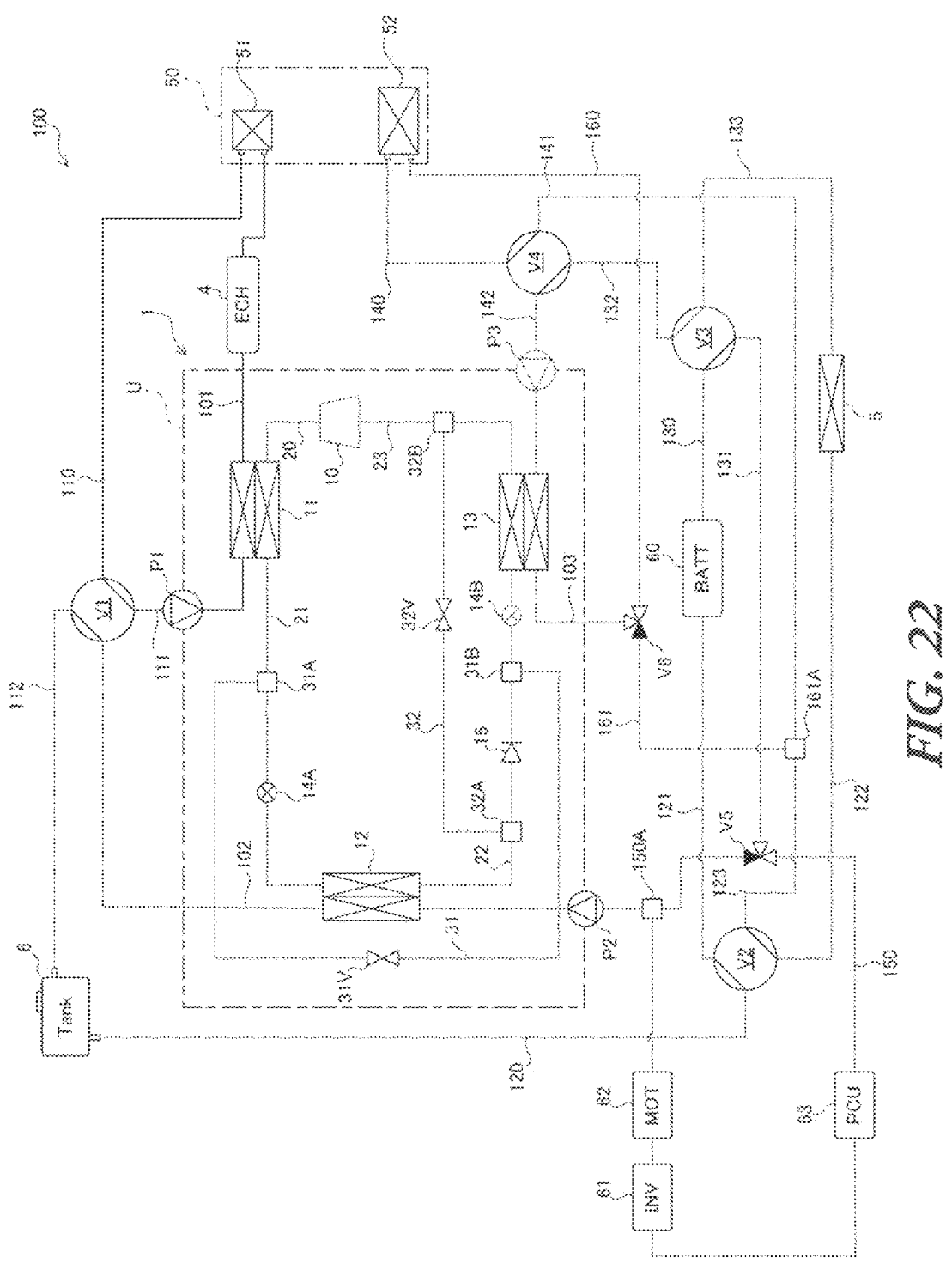
FIG. 22 illustrates another example of the placement of the auxiliary heater.

FIG. 22 illustrates an example of the operation when the auxiliary heater 4 is provided on the outlet side of the first refrigerant-heat medium heat exchanger 11. In this case, the heat medium heated by the auxiliary heater 4 can be flowed directly to the heater core 51 via a short flow path, and therefore it is possible to perform the heating operation with less heat loss, and to adjust the temperature for the heating operation by the auxiliary heater 4.

With this example of the operation, when the compressor 10, the expansion valve 14B (or the expansion valve 14A), or the circulating pump P3 has broken down, it is possible to form an individual circuit to circulate through the circulating pump P1, the auxiliary heater 4, the heater core 51, the selector valve V1, and return to the circulating pump P1 as illustrated, and therefore to perform the heating operation. In addition, the selector valves V1 to V6 are appropriately switched to connect the flow paths of the heat medium circuit 100 in series. By this means, even when the breakdown occurs in the refrigerant circuit 1 as described above, it is possible to perform the heating operation and also to adjust the temperature of the battery via the temperature-adjusted subject heat exchanger 60 by the auxiliary heater 4.

FIG. 22 illustrates the case where the breakdown occurs in the refrigerant circuit 1, but when the refrigerant circuit 1 can be operated, the auxiliary heater 4 is provided not on the inlet side but on the outlet side of the first refrigerant-heat medium heat exchanger 11. By this means, it is possible to improve the COP of the operation with the auxiliary heater 4 added to the refrigerant circuit 1. On the other hand, in the operation with the auxiliary heater 4 added to the refrigerant circuit 1, when the auxiliary heater 4 is provided on the inlet side of the first refrigerant-heat medium heat exchanger 11, it is possible to raise the temperature of the heat medium immediately after actuating the auxiliary heater 4, and therefore to raise the temperature of the refrigerant circuit 1 on the high-pressure side. Consequently, it is possible to improve the start-up performance of the refrigerant circuit 1.

Figure 23:
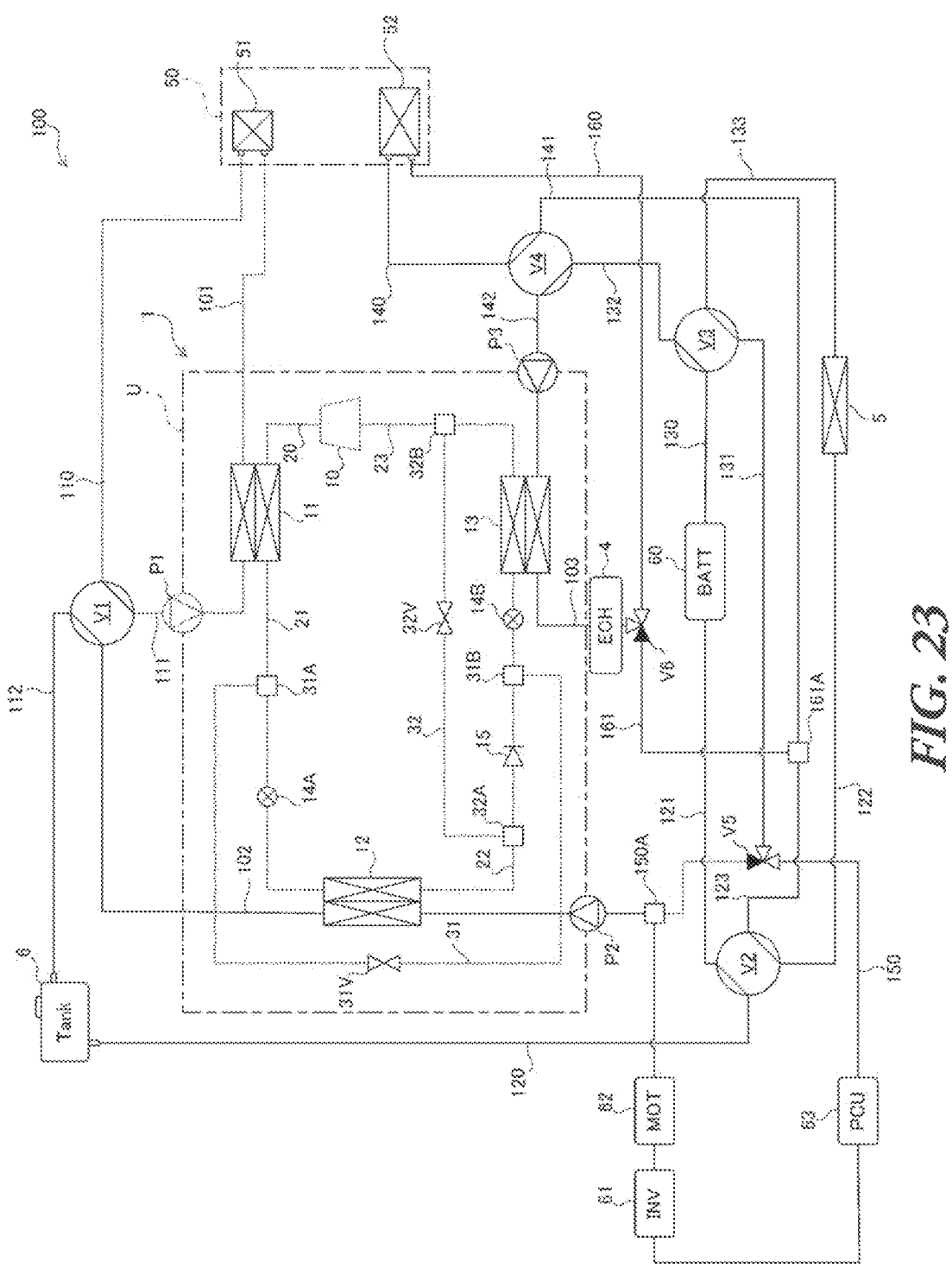
FIG. 23 illustrates another example of the placement of the auxiliary heater.

FIG. 23 illustrates an example of the operation when the breakdown occurs in the refrigerant circuit 1 as described above, and the auxiliary heater 4 is provided on the outlet side of the third refrigerant-heat medium heat exchanger 13. Also with the example of the operation, it is possible to perform the heating operation by flowing the heat medium heated by the auxiliary heater 4 to the cooler core 52 (used as the heater core), and possible to flow the heat medium having exited from the cooler core 52 to the temperature-adjusted subject heat exchangers 60, 61, 62, and 63 to adjust the temperature of the battery and so forth together.

In this case, the temperature of the heat medium flowed into the cooler core 52 used as the heater core is set to 50 degrees Celsius to perform the heating operation, and the heat is released in the outdoor heat exchanger 5 to set the temperature of the heat medium flowed into the temperature-adjusted subject heat exchanger 60 to be equal to or lower than 35 degrees Celsius of the maximum allowable temperature. By this means, it is possible to perform the heating operation and adjust the temperature of the battery at the optimum temperatures, respectively. With this example of the operation, it is possible to achieve the equivalent function when the auxiliary heater 4 is provided on the inlet side of the third refrigerant-heat medium heat exchanger 13.

As described above, the embodiments of the present invention have been described in detail with reference to the drawings. However, the specific configuration is not limited to these embodiments, and the design can be changed without departing from the scope of the present invention. In addition, the above-described embodiments can be combined by utilizing each other's technology as long as there is no particular contradiction or problem in the purpose and configuration.

REFERENCE SIGNS LIST

1: refrigerant circuit, 2: refrigerant circulating flow path,
3 (31, 32): bypass refrigerant flow path,
4: auxiliary heater, 5: outdoor heat exchanger,
6: tank, 10: compressor,
11: first refrigerant-heat medium heat exchanger,
12: second refrigerant-heat medium heat exchanger,
13: third refrigerant-heat medium heat exchanger,
14, 14A, 14B: decompressor,
15: backflow preventer, 20, 21, 22, 23: refrigerant flow
    path,
31A, 32A: branching point, 31B, 32B: joining point
31V, 32V: on-off valve, 50: indoor air conditioner,
51: heater core, 52: cooler core,
60, 61, 62, 63: temperature-adjusted subject heat
    exchanger,
100: heat medium circuit,
101, 102, 103: heat medium flow path,
110, 111, 112, 120, 121, 122, 123, 130, 131, 132, 133, 140,
    141, 142, 150, 160, 161, 200, 201, 202, 203, 204,205:
    flow path,
150A, 160A, 161A: joining point
300: controller,
V1, V2, V3, V4, V5, V6, V11, V12, V21, V22, V31, V32,
    V41, V42, V01, V02, V03: selector valve,
U: unit, P1, P2, P3: circulating pump

The invention claimed is:

1. A vehicle heat management system comprising:
   a refrigerant circuit configured to compress, condense, expand and evaporate refrigerant and including a first refrigerant-heat medium heat exchanger, a first decompressor, a second refrigerant-heat medium heat exchanger, a second decompressor, and a third refrigerant-heat medium heat exchanger; and
   a heat medium circuit through which heat medium having been subjected to a heat exchange with the refrigerant in at least one of the first refrigerant-heat medium heat exchanger, the second refrigerant-heat medium heat exchanger, and the third refrigerant-heat medium heat exchanger circulates, wherein:
   the first refrigerant-heat medium heat exchanger functions as a condenser;
   the first decompressor is provided between the first refrigerant-heat medium heat exchanger and the second refrigerant-heat medium heat exchanger;
   the second refrigerant-heat medium heat exchanger is configured to selectively function as a condenser and an evaporator;
   the second decompressor is provided between the second refrigerant-heat medium heat exchanger and the third refrigerant-heat medium heat exchanger;
   the heat medium circuit includes a switch device configured to be able to switch between a circuit state in which the heat medium having passed through the second refrigerant-heat medium heat exchanger flows to the first refrigerant-heat medium heat exchanger and a circuit state in which a flow path of the heat medium having passed through the first refrigerant-heat medium heat exchanger and a flow path of the heat medium having passed through the second refrigerant-heat medium heat exchanger form individual circuits, respectively; and
   the switch device is configured to be able to switch to the circuit state in which the flow path of the heat medium having passed through the first refrigerant-heat medium heat exchanger and the flow path of the heat medium having passed through the second refrigerant-heat medium heat exchanger form individual circuits, respectively, when the first refrigerant-heat medium heat exchanger and the second refrigerant-heat medium heat exchanger both function as condensers.

2. The vehicle heat management system according to claim 1, wherein:
   a flow path of the heat medium passing through the third refrigerant-heat medium heat exchanger and the flow path of the heat medium passing through the first refrigerant-heat medium heat exchanger or the second refrigerant-heat medium heat exchanger form individual circuits, respectively.

3. The vehicle heat management system according to claim 1, wherein the heat medium passing through the first refrigerant-heat medium heat exchanger flows through a vehicle compartment air conditioning heat exchanger.

4. The vehicle heat management system according to claim 1, wherein the heat medium circuit includes an auxiliary heater provided on an inlet side or an outlet side of one of the first refrigerant-heat medium heat exchanger, the second refrigerant-heat medium exchanger, and the third refrigerant-heat medium heat exchanger.

5. The vehicle heat management system according to claim 1, wherein the heat medium circuit includes a tank provided on an outlet side of the switch device and configured to store the heat medium.

6. The vehicle heat management system according to claim 1, wherein at least two refrigerant-heat medium heat exchangers of the refrigerant circuit that are configured to be selected are configured to be selected by an opening and closing of a bypass refrigerant flow path configured to bypass one of the at least three refrigerant-heat medium heat exchangers.

7. The vehicle heat management system according to claim 1, wherein the third refrigerant-heat medium heat exchanger is an evaporator.

8. The vehicle heat management system according to claim 1, wherein the at least one of the first refrigerant-heat medium heat exchanger, the second refrigerant-heat medium heat exchanger, and the third refrigerant-heat medium heat exchanger includes the first refrigerant-heat medium heat exchanger and the second refrigerant-heat medium heat exchanger, and the third refrigerant-heat medium heat exchanger of the refrigerant circuit is an evaporator functioning as a vehicle compartment air conditioning heat exchanger.

9. The vehicle heat management system according to claim 2, wherein:

the switch device is a first switch device; and a second switch device is provided to switch to select whether the heat medium having exited from the first switch device flows to a temperature-adjusted subject heat exchanger or an outdoor heat exchanger.

10. The vehicle heat management system according to claim 9, further comprising a third switch device configured to be switched in conjunction with the second switch device, wherein the third switch device switches to select whether the heat medium flowed to the temperature-adjusted subject heat exchanger by the second switch device flows to the second refrigerant-heat medium heat exchanger or the third refrigerant-heat medium heat exchanger, and the third switch device switches to select whether the heat medium flowed to the outdoor heat exchanger by the second switch device flows to the third refrigerant-heat medium heat exchanger or the second refrigerant-heat medium heat exchanger.

11. The vehicle heat management system according to claim 10, further comprising:

a vehicle compartment air conditioning heat exchanger through which the heat medium having been subjected to a heat exchange in the third refrigerant-heat medium heat exchanger flows; and a fourth switch device configured to switch to select whether the heat medium having exited from the vehicle compartment air conditioning heat exchanger flows to the third refrigerant-heat medium heat exchanger, or enters the second switch device, wherein the second switch device also functions as a switch device configured to switch to select whether the heat medium having exited from the fourth switch device flows to the temperature-adjusted subject heat exchanger or the outdoor heat exchanger.

12. The vehicle heat management system according to claim 11, wherein the third switch device also functions as a switch device configured to switch to select whether the heat medium having exited from the outdoor heat exchanger flows to the second refrigerant-heat medium heat exchanger or enters the fourth switch device.

13. The vehicle heat management system according to claim 12, wherein the fourth switch device also functions as a switch device configured to switch to select whether the heat medium having exited from the third switch device flows to the third refrigerant-heat medium heat exchanger or enters the second switch device.

14. The vehicle heat management system according to claim 9, further comprising a fifth switch device configured to switch to select whether or not to flow the heat medium having exited from the temperature-adjusted subject heat exchanger to another temperature-adjusted subject heat exchanger.

15. The vehicle heat management system according to claim 11, further comprising a sixth switch device configured to switch to select whether the heat medium having been subjected to a heat exchange in the third refrigerant-heat medium heat exchanger flows to the vehicle compartment air conditioning heat exchanger or the second switch device.

* * * * *